United States Patent
Nagarjuna et al.

(10) Patent No.: US 11,308,177 B2
(45) Date of Patent: Apr. 19, 2022

(54) SYSTEM AND METHOD FOR ACCESSING AND MANAGING COGNITIVE KNOWLEDGE

(71) Applicant: Sutherland Global Services, Inc., Pittsford, NY (US)

(72) Inventors: Phani Kumar Nagarjuna, Danville, CA (US); Navaneethan Thirumurthy, Tracy, CA (US)

(73) Assignee: Sutherland Global Services Inc., Pittsford, NY (US)

( * ) Notice: Subject to any disclaimer, the term of this patent is extended or adjusted under 35 U.S.C. 154(b) by 157 days.

(21) Appl. No.: 16/689,486

(22) Filed: Nov. 20, 2019

(65) Prior Publication Data
US 2021/0149979 A1    May 20, 2021

(51) Int. Cl.
*G06F 16/00*   (2019.01)
*G06F 16/9538*   (2019.01)
*G06F 7/08*   (2006.01)

(52) U.S. Cl.
CPC ........... *G06F 16/9538* (2019.01); *G06F 7/08* (2013.01)

(58) Field of Classification Search
CPC ........ G06F 16/9538; G06F 7/08; G06F 16/36; G06N 3/02
See application file for complete search history.

(56) References Cited

U.S. PATENT DOCUMENTS

| | | | | |
|---|---|---|---|---|
| 2011/0314375 A1* | 12/2011 | Zaika | ................... | G06F 3/0482 715/708 |
| 2013/0282594 A1* | 10/2013 | Gaedcke | ............ | G06Q 30/0241 705/304 |
| 2014/0245141 A1* | 8/2014 | Yeh | ........................ | G06F 3/0481 715/708 |
| 2014/0337330 A1* | 11/2014 | Venkata | ................ | G06F 16/957 707/723 |
| 2014/0337727 A1* | 11/2014 | Earurnthavadi | ........ | G06F 9/453 715/708 |
| 2015/0205621 A1* | 7/2015 | Kading | ............... | G06F 3/04842 715/708 |
| 2017/0286548 A1* | 10/2017 | De | ........................ | G06F 16/248 |
| 2019/0018692 A1* | 1/2019 | Indyk | ...................... | G06F 9/453 |
| 2019/0340253 A1* | 11/2019 | Roy | ........................ | G06F 16/901 |
| 2020/0019420 A1* | 1/2020 | Saimani | ................... | G06N 5/04 |

\* cited by examiner

*Primary Examiner* — Jared M Bibbee
(74) *Attorney, Agent, or Firm* — Woods Oviatt Gilman LLP; Dennis B. Danella, Esq.

(57) ABSTRACT

A method programmed for execution in a computing environment for accessing help content from a plurality of help content data sources is provided, wherein the plurality of help content data sources includes a first group of help content data sources and a second group of help content data sources. Using a processor, the method comprises the steps of: locating help data by searching the first group of help content data sources over a network, and searching the second group of help content data sources stored in a memory; sorting the located help data so that the located help data is searchable, and allowing the sorted help data to be searched so that a list of relevant search results is displayed on a computing device, wherein each search result within the list of relevant search results includes access to the help data.

62 Claims, 25 Drawing Sheets

SYSTEM AND METHOD FOR ACCESSING AND MANAGING COGNITIVE KNOWLEDGE

FIELD OF THE INVENTION

The present invention relates to a system and method for accessing and managing cognitive knowledge; in particular, the system and method provides a computer environment for integrating disparate knowledge bases including help content data sources, providing for the creation of help data in the form of knowledge-based articles and decision trees that are integrated with the integrated knowledge bases, and providing for log analytics to assist with solving technical issues with log files.

BACKGROUND OF THE INVENTION

It is common for people in today's society to need assistance with assembling, installing, operating, and/or fixing consumer products, software applications, or in performing other tasks. When confronted with an issue, one common method of seeking assistance, after consulting any written instructions provided therewith, involves searching the Internet to locate the specific website of the manufacturer or distributor of the item to determine if there is any frequently asked questions (FAQs) that may address the issue at hand. This information is typically very limited as the FAQs are not very detailed and intended to address basic and general information about a given product. After consulting the manufacturer's or distributor's website, an individual may then move on to perform an Internet search using natural language or Boolean search strings to obtain a list of websites that could possibly contain information related to the specific issue presented to the individual. After the Internet search results are populated, the individual then needs to click on each website search result and read the content provided on the website to determine whether the content includes a solution for the specified issue. This process can be time consuming and the results are limited to only to the websites that contain relevant information that correspond to the search criteria specified by the individual. Furthermore, the content contained in websites can sometimes be outdated thereby requiring an additional level of inquiry to determine the usefulness of the information.

Another method of seeking assistance is for an individual to contact a help desk assistance center via e-mail, chat or by phone so that a help desk assistant can help trouble shoot the issue presented to the individual. In particular, the individual proceeds by verbally describing the issue to the help desk assistant, at which time the help desk assistant performs a standard search within a local help desk database to locate a solution to the issue that has been presented. The local help desk database typically only provides access to a pre-established collection of standard text-based articles that the help desk assistant has to sort through and read in order to make a determination as to their relevance. If the local help desk database does not yield any results that are helpful, the help desk assistant may be forced to navigate off of the local help desk database and seek out a solution to the issue using an entirely different program, such as resorting to the use of a separate website browser to conduct an Internet search similar to what an end user would do if resorting to self-help. Switching back and forth between disparate searching platforms and sources of information is inefficient and results in longer wait times for an end user.

In view of the above, there is a need for a system and method that provides for the efficient identification of useful help content without having to conduct searches on multiple platforms. The aspects of the system and method provided herein address these needs as well as other needs.

BRIEF SUMMARY OF THE INVENTION

As will be described in more detail below, a system including a cognitive knowledge platform for accessing help content from a plurality of help content data sources is provided, wherein the plurality of help content data sources includes a first group of help content data sources and a second group of help content data sources. The system comprises a server comprising a memory and a processor, wherein the server is in communication with the first group of help content data sources over a network, and wherein the second group of help content data sources is stored in the memory. The processor is configured for executing computer-executable instructions stored in the memory comprising: locating help data by searching the first group of help content data sources and the second group of help content data sources, sorting the located help data so that the located help data is searchable, and allowing the sorted help data to be searched so that a list of relevant search results are displayed on a computing device, wherein each search result within the list of relevant search results includes access to the help data.

The first group of help content data sources may include at least one of website pages, blogs, chat bots, chat data, knowledge-based applications, customer relationship management (CRM) applications, email data, discussion forums, self-help portals, data lakes, and enterprise data sources. The help data may be at least one of website content, data files, videos, pictures, text, instructions, links, attachments, flow charts, or other help related information. Further, the access to help data may include providing at least one of a link to access the respective help content data source or displaying information from the respective help content data source.

The second group of help content data sources may include at least one of a created decision tree and/or knowledge-based article, which may have a document attached thereto including help content. The decision tree may further include a root node, at least two leaf nodes, and a branch connecting the root node to the at least two leaf nodes, wherein the root node and the at least two leaf nodes provide for the display of help data. Further, a link may be inserted into at least one of the at least two leaf nodes, wherein the link is configured to provide access to help content data contained in the help content data source in the first or second group of help content data sources. Moreover, the sorted help data may be provided using machine learning from previous searches that have bene performed.

In another aspect, the server may be configured for receiving at least one log file, wherein each log file includes a plurality of log entries including unstructured log data, wherein the log file is created by at least one of a computer operating system and an application log. In this aspect, the computer-executable instructions may be configured for: parsing the at least one log file to change the unstructured log data into structured log data, allowing the structured log data to be indexed to allow for the structured data to be searched or filtered to identify a log file search result, using the log file search result to searching the sorted help data, and displaying the list of relevant search results related to the log file search result. The use of the log file search result to search the sorted help data and the display of the list of relevant search results related to the log file search result may be automatic.

In another aspect, a method programmed for execution in a computing environment for accessing help content from a plurality of help content data sources is provided. The plurality of help content data sources includes a first group of help content data sources and a second group of help content data sources, wherein using a processor the method comprises the steps of: locating help data by searching the first group of help content data sources over a network, and searching the second group of help content data sources stored in a memory; sorting the located help data so that the located help data is searchable; and allowing the sorted help data to be searched so that a list of relevant search results is displayed on a computing device, wherein each search result within the list of relevant search results includes access to the help data. In the method, the first group of help content data sources may include at least one of: website pages, blogs, chat bots, chat data, knowledge-based applications, customer relationship management (CRM) applications, email data, discussion forums, self-help portals, data lakes, and enterprise data sources. The help data may be at least one of website content, data files, videos, pictures, text, instructions, or other help related information. Further, the access to help data includes providing at least one of a link to access the respective help content data source or displaying information from the respective help content data source.

The second group of help content data sources may include at least one of a decision tree and knowledge-based article, wherein the computer-executable instructions further include allowing for the creation of the knowledge-based article, and allows for a document to be attached to the knowledge-based article. Further, the method allows for the creation of the decision tree. The decision tree may include a root node, at least two leaf nodes, and a branch connecting the root node to the at least two leaf nodes, wherein the root node and the at least two leaf nodes provide for the display of help data. The method further allows for an insertion of a link into at least one of the at least two leaf nodes, wherein the link is configured to provide access to help content data contained in the help content data source in the first or second group of help content data sources.

In another aspect, the method may further include the steps of: receiving at least one log file, wherein each log file includes a plurality of log entries including unstructured log data; parsing the at least one log file to change the unstructured log data into structured log data; allowing the structured log data to be indexed to allow for the structured data to be searched or filtered to identify a log file search result; using the log file search result to searching the sorted help data; and displaying the list of relevant search results related to the log file search result. Use of the log file search result to search the sorted help data and the display of the list of relevant search results related to the log file search result may be automatic. The log file may be from at least one of a computer operating system and an application log.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Generally, the system, tools and methods described herein for providing a cognitive knowledge platform for accessing help content from a plurality of help content data sources to form an integrated knowledge base. The platform may also allow for the management of the help content to allow for the creation, editing and approval of custom knowledge-based articles and decision trees that are accessible through the platform, and which can provide access to relevant help data in the integrated knowledge base. The platform may also provide for intelligent log analytics to assist with solving technical issues with log files from operating systems or computer applications. It will be understood that the cognitive knowledge platform may be implemented in the form of software, hardware, or combinations thereof.

Figure 1:
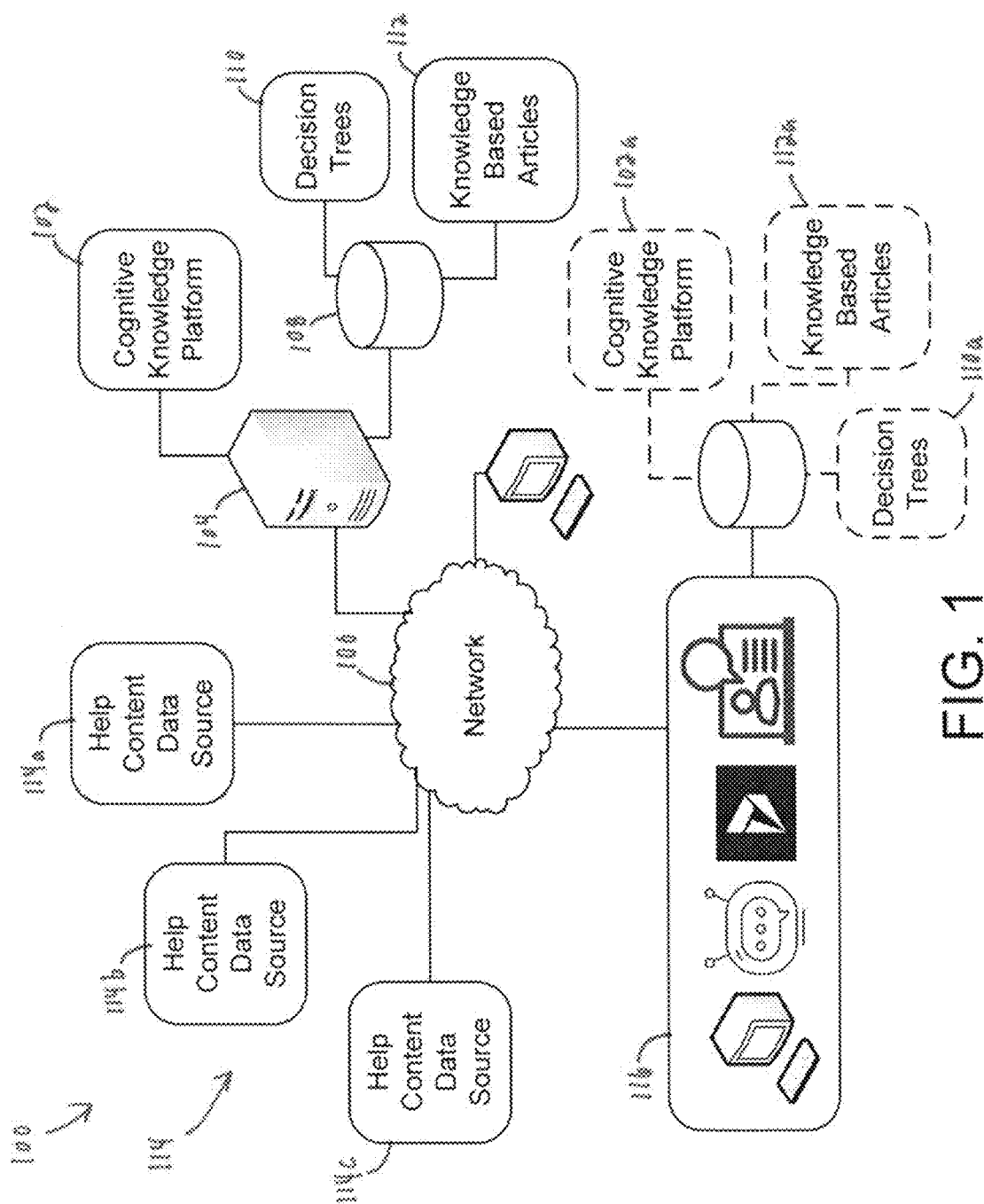
FIG. 1 is a schematic diagram showing an exemplary network environment or system in which a cognitive knowledge platform for accessing and managing cognitive knowledge in accordance with an aspect of the present invention may be implemented.

Referring to the drawings in detail, and specifically to FIG. 1, reference numeral 100 generally designates an exemplary network environment or system in which a cognitive knowledge platform 102 (i.e., cognitive knowledge engine (CKE)) in accordance with one aspect of the invention may be implemented. The cognitive knowledge platform 102 may take the form of computer executable instructions configured for performing the functionality described below. In one embodiment, cognitive knowledge platform 102 may be stored in the memory of a server 104 that is in wired or wireless communication with a network 106. Network 106 may be a wide area network (WAN), such as for example, the Internet, but it should be understood that any other type of network may be utilized including a local area network (LAN). Server 104 may also include a remote of local memory 108 that allows for the storage of one or more data files that are representative of one or more help content data sources, such as decision trees 110 and/or knowledge based articles 112 that are created using cognitive knowledge platform 102 described in more detail below. Decision trees 110 and/or knowledge based articles 112 are considered to be a first group of help data content data source that includes help content that may be accessed by cognitive knowledge platform 102.

System 100 may further include a second group of plurality of help content data sources 114 that are in communication with server 104 and cognitive knowledge platform 102 through network 106. Each of help content data sources 114a, 114b, 114c include help content that may be accessed using cognitive knowledge platform 102. Help data sources 114a, 114b, 114c may include at least one of website pages, blogs, chat bots, chat data, knowledge-based applications, customer relationship management (CRM) applications, email data, discussion forums, self-help portals, data lakes, and enterprise data sources. The help content contained within help content data sources 114, decision trees 110, and knowledge based articles 112 may include at least one of website content, data files, videos, pictures, text, instructions, links, attachments, flow charts, associated components thereof, and other help related information that would assist with solving an issue that searched using cognitive knowledge platform 102.

In one aspect, system 100 may further include a client 116 that is in communication with server 104 and cognitive knowledge platform 102 through network 106. Client 116 may access cognitive knowledge platform 102 to automatically or manually perform a search of at least one of help content data sources 114, decision trees 110, and/or knowledge based articles 112 to locate and display help content that is related to inputted search criteria that will assist with solving an issue. Client 116 may take the form of a desktop computing device, mobile computing device, chat bot, website application, self-service portal, customer resource management (CRM) application, unified search application, or other software application or device that includes the ability to utilize and interface with cognitive knowledge platform 102 and display or otherwise communicate the located help content through written, electronic or voice communication.

In another aspect, it should be understood that cognitive knowledge platform 102a may also be stored in a local memory 120 associated with client 116. In this instance, cognitive knowledge platform 102a would operate similarly to cognitive knowledge platform 102 except that client would not necessarily need to communicate with server 104 over network to utilize the functionality of the cognitive knowledge platform 102a except to the extent that knowledge based articles 112 and/or decision trees 110 are to be accessed over network 106. Further, the knowledge based articles 112a and/or decision trees 110a may be stored in local memory 120. In the following discussion, it should be understood that any reference to the cognitive knowledge platform 102, decision trees 110, and knowledge based articles 112 shall also apply to the cognitive knowledge platform 102a, decision trees 110a, and knowledge based articles 112a unless the context dictates otherwise.

Figure 2:
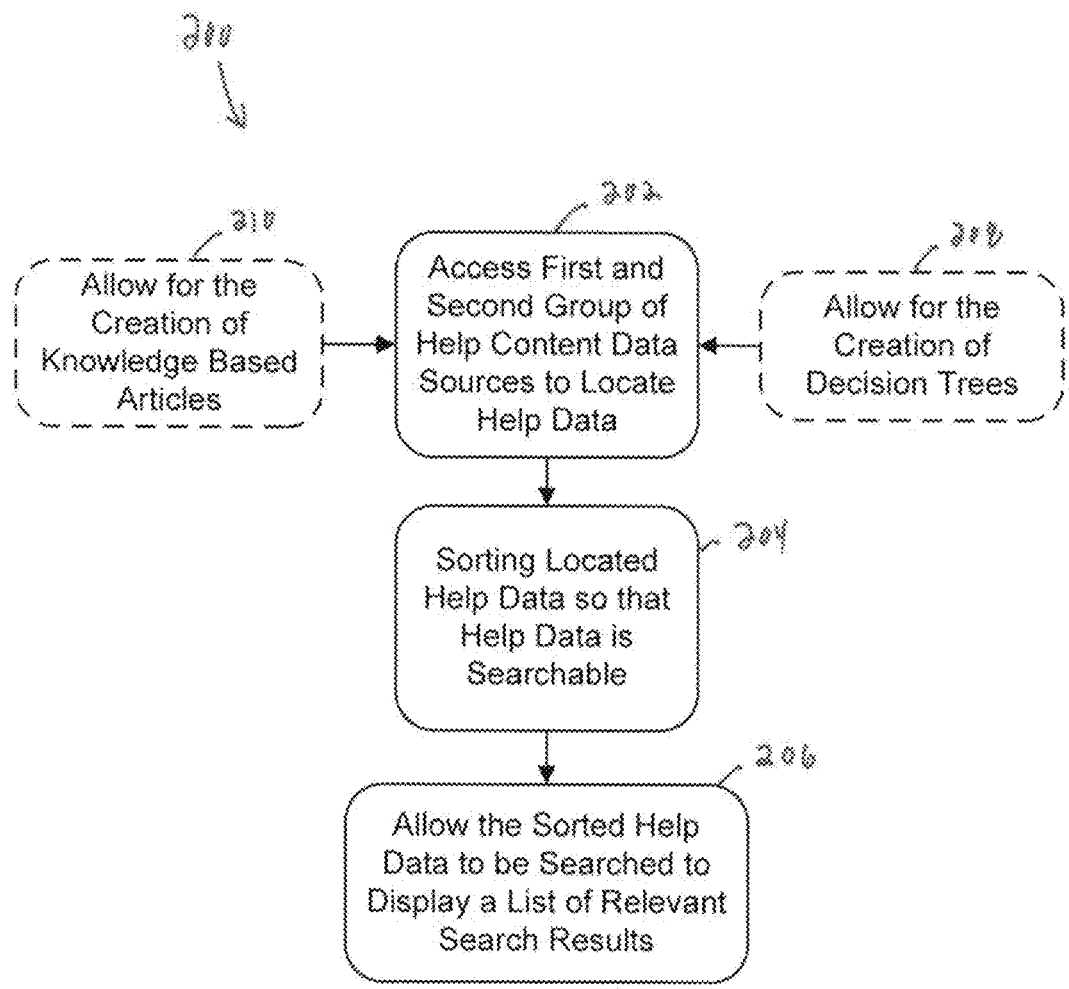
FIG. 2 is a flow chart showing an exemplary method that may be performed using the cognitive knowledge platform in accordance with an aspect of the present invention.

Having generally described system 100 set forth above, an exemplary method 200 will now be provided to illustrate processes that can be executed using the computer instructions embodied by cognitive knowledge platform 102 and the components set forth in system 100. For example, as best seen in FIG. 2, the method 200 includes locating help data by searching or accessing the first group of help content data sources 114 over network 106, and searching or accessing the second group of help content data sources 110, 112 stored in memory 108 at step 202. At step 204, the cognitive knowledge platform 102 is configured for sorting the located help data so that the located help data is searchable. The cognitive knowledge platform 102 then allows the sorted help data to be searched so that a list of relevant search results is displayed on a display of client 116 at step 206, wherein each search result within the list of relevant search results includes access to the help data. The access to the help data may include providing at least one of a link to access the respective help content data source or displaying information from the respective help content data source. Method 200 provides an integrated knowledge-base that provides access to help content from multiple disparate sources that can be accessed using cognitive knowledge platform 102.

In another aspect, method 200 may also provide computer-executable instructions that allow for the creation of knowledge based articles at step 208 that may be stored in memory 108 and become part of the help content contained in help content data source 112. In a further aspect, method 200 may include computer-executable instructions that allow for the creation of one or more decision trees at step 210 that may be stored in memory 108 and become part of the help content contained in help content data source 110. Allowing for the creation of custom knowledge based articles and decision trees, and making them accessible along with multiple help content data sources 114 accessible over a network provides a robust knowledge based platform that allows help content to be searched and located in an efficient manner.

Figure 3:
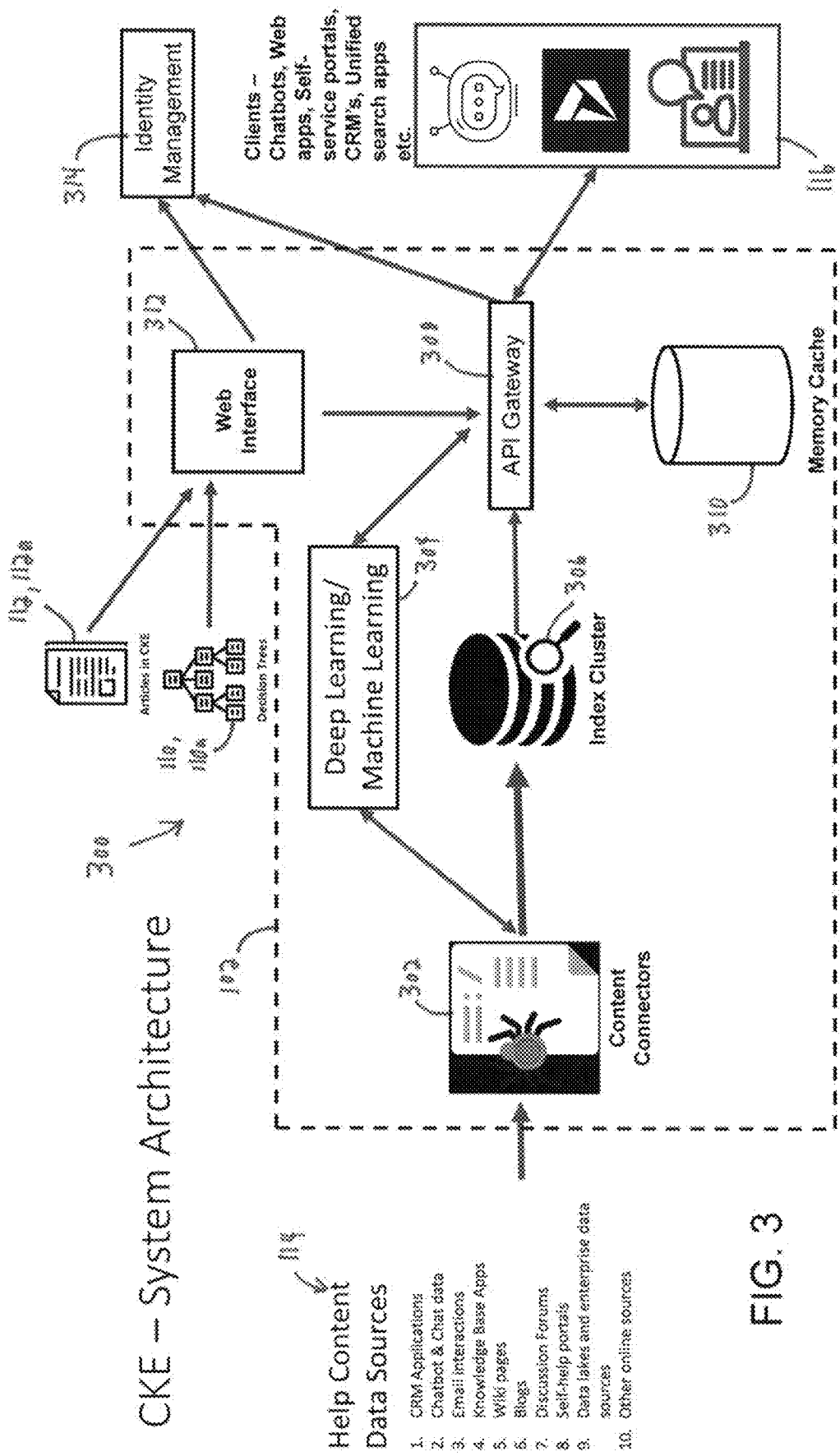
FIG. 3 is a schematic drawing showing an exemplary system architecture of the cognitive knowledge platform in accordance with an aspect of the present invention.
Figure 4:
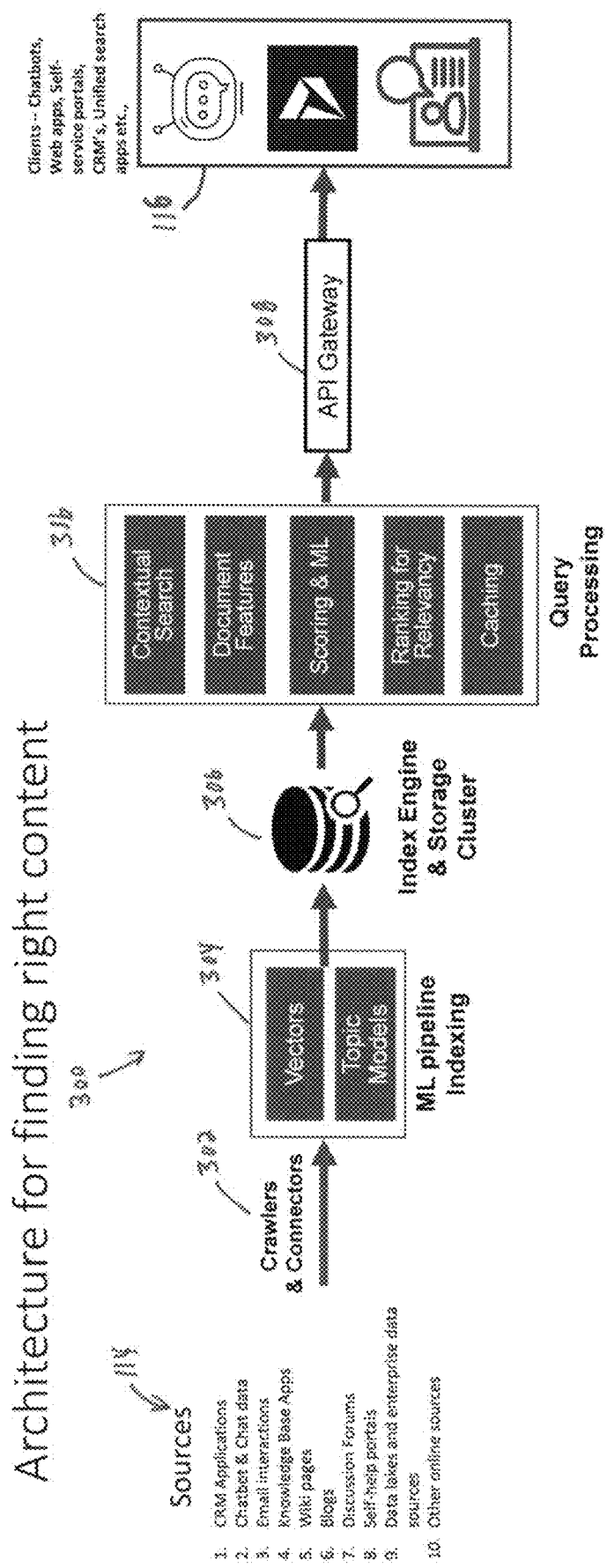
FIG. 4 is a schematic drawing showing an exemplary architecture for finding relevant help content using the method described herein in accordance with an aspect of the present invention.

Having described a method that may be implemented using the cognitive knowledge platform 102, one exemplary system architecture 300 for finding relevant help content using the methodology described above will now be described with reference to FIGS. 3 and 4. As previously mentioned, cognitive knowledge platform 102 has access to a plurality of help content data sources 114 through network 106. In particular, system architecture 300 may include one or more content connectors and/or crawlers 302 that are configured to locate help content by traversing data contained within help content data sources 114 and populate one or more data repositories (e.g., table(s)) accessible to cognitive knowledge platform 102. A machine learning (artificial intelligence) module 304 including computer executable instructions may be provided to automatically correlate help content contained in help content data sources 114 using vectors and topic models to identify similar linguistically significant words that are useful in parsing a sentence (i.e., tokens) and associate them with one another. System architecture 300 further includes an index engine and storage cluster 306 that operates to sort the data populated in the one or more data repositories by content connector 304 to allow the help content to be located when a search is performed using cognitive knowledge platform 102. Content connectors (or connectors) perform the function of bringing the data from different source/systems and running machine learning and AI pipeline to create topic models and word vectors from the content. The search uses topic models, word vectors, a plurality of machine learning features and algorithm(s) that identify the content using the "intent" predicted. Further, key phrases (e.g., bigrams, trigrams, etc.) in the sorted data that are identified by the word vectors during process of ingesting the data from different sources into the index cluster may be correlated with the help content to allow for synonyms to be created or curated automatically. When a search is performed or a query is processed, cognitive knowledge platform 102 includes computer executable instructions that use a number of functions to locate and provide access to help content in help content data sources 114, decision trees 110, and knowledge based articles 112, including but not limited to, a contextual search, document features, scoring criteria, machine learning, ranking for relevancy, and caching. Document features may include the date of document creation, date published, date modified, date last viewed, date last liked, number of likes, number of boosts, date last boosting happened. It may also take into account where the "intent" of the search was found such as title of the document, body of the document, document category/sub category, attachments, etc. Scoring for each document may be done based on an algorithm (e.g., BM25) after the "intent" is identified. The process along involved "stemming" and "lemmatization" of the content, along with other techniques such as similarity search. Once the initial scoring is done, other document features are applied to the machine learning model to raking the content, leading to relevancy of the searched articles/content.

System architecture 300 may further include an application program interface (API) 308 that allows for communication between certain components of cognitive knowledge platform 102 (i.e., index cluster 306, machine learning module 304, a memory cache 310, a web interface 312), and an identity management module 314 and client 116. Memory cache 310 may be configured to store previously asked results in a quick access memory storage that would help in faster page by response, faster response when filters are applied and faster results when similar search Is done. It should be understood that in-memory clusters may be used to manage the cache data.

Cognitive knowledge platform 102 may further include computer executable instructions that provide certain administrative portal functions that will be described with reference to the exemplary interface displays in FIGS. 5-13 and 20. These administrative functions may be accessed, for example, if authorized administrative credentials are entered using identity management module 314 through client 116, or an administrator computing device 118 (FIG. 1) that is in direct connection with server 104, or remotely connected with server 104 through network 106.

Figure 5:
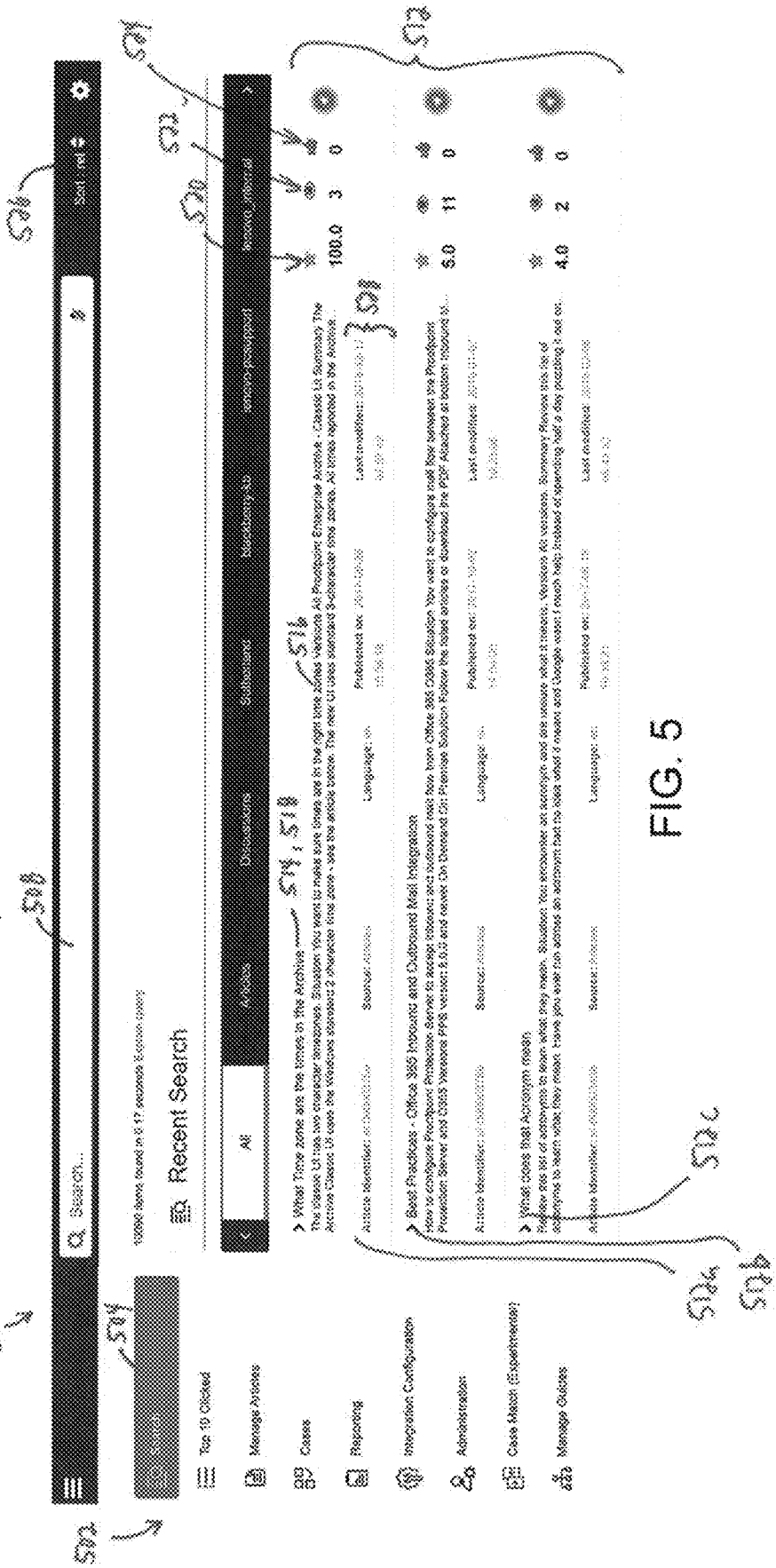
FIG. 5 is an exemplary administrative interface display of a search screen in accordance with an aspect of the present invention.

As best seen in FIG. 5, an administrative interface 500 may include a menu 502 including a plurality of buttons that may be selected using a user interface selection device to perform certain functions. In particular, menu 502 may include a search button 504 that when activated displays a window 506 shown in FIG. 5. Window 506 may include a search entry field 508 that allows a user to enter one or more letters, words, phrases, numbers, symbols, or any combination (i.e., search terms) thereof in natural language, Boolean, or other format to locate help content located within help data content sources 114, decision trees 110, and/or knowledge based articles 112. As search terms are entered into search entry field 508, cognitive knowledge platform 102 operates to use system architecture 300 to populate and display a search results window 510 with one or more search results 512. Each of the search results 512a, 512b, 512c includes a title 514 that identifies the help content and text 516 that provides at least a portion of the help content from the help data content sources 114, decision trees 110, and/or knowledge based articles 112. It should also be understood that each of the search results 512a, 512b, 512c may also include a link 518 that may be selected to allow cognitive knowledge platform 102 to navigate directly to the help content located within help data content sources 114, decision trees 110, and/or knowledge based articles 112. Link 518 may be embedded within title 514, or it may be separate from title 514. Each search result may also include a relevancy rating 520, a counter 522 to identify how many times the search result has been selected, and an indicator 524 to signify that the article was liked by a user of cognitive knowledge platform 102. Each of these items 520, 522, and 524 can be used to sort the search results 512 using a sort button 526. Other relevant information 528 may also be provided with each search result 512a, 512b, 512c, such as, but not limited to an article identifier, source of the search result, language of the help content, publication date of the help content, and the date the help content was last modified.

Figure 6:
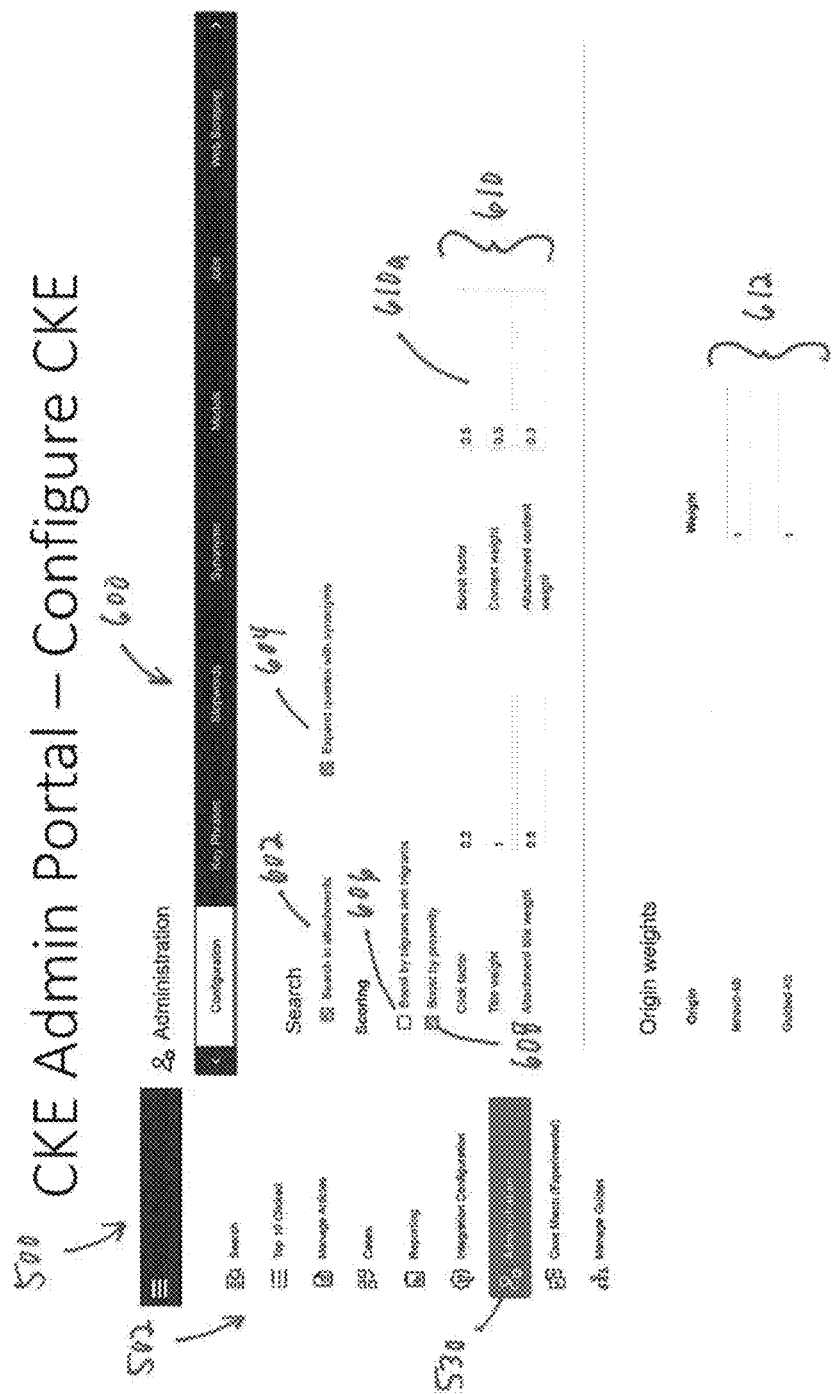
FIG. 6 is an exemplary administrative interface display of a search configuration screen in accordance with an aspect of the present invention.

As best seen in FIG. 6, administrative interface 500 may include an administration button 530 that when selected displays a window 600 that provides functionality to configure certain search parameters and scoring criteria to produce the relevancy rating 520. For example, window 600 provides a check box 602 that allows any attachments (e.g., documents or other files) included in or associated with decision trees 110 and/or knowledge based articles 112 to be searched when search terms are entered into search entry field 508. Window may also provide a check box 604 that when activated operates to expand any search query to synonyms of one or more of the search terms entered into search entry field 508. Window 600 may also include a check box 606 that when activated operates to provide an additional scoring boost to the relevancy rating 520 using bigrams and trigrams. Window 600 may also include a check box 608 that when activated operates to allow for the entry of numerical values in data entry fields 610 that provide for the selective weighting of different criteria to assist in determining the relevancy rating 520 for a search result. For example, the criteria may include one or more of the number of clicks on the search result, title weight, attachment title weight, boost factor, help content weight, and attachment content weight. Window 600 may also allow for the selective weighting of different help content data sources, decision trees 110 and knowledge based articles 112 by entering numerical values in data entry fields 612 to assist in determining the relevancy rating 520 for a search result.

Figure 7:
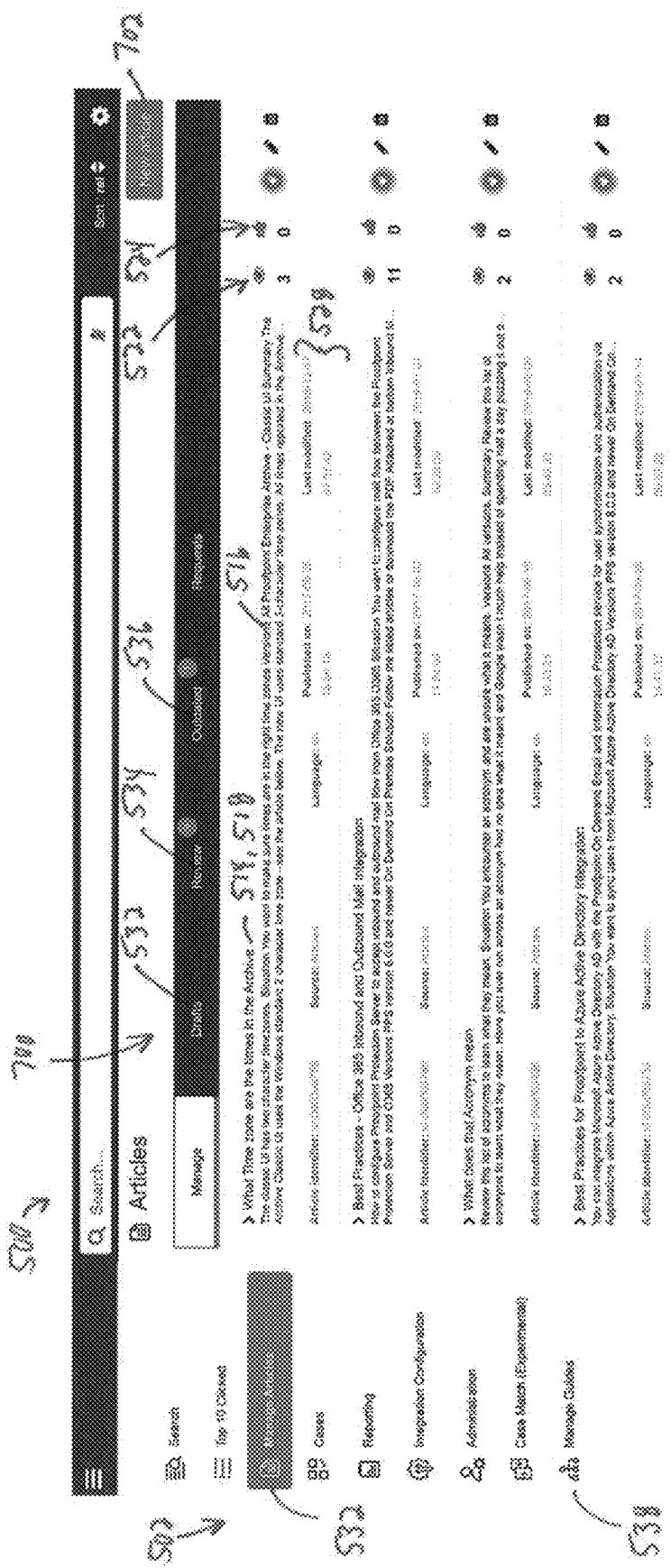
FIG. 7 is an exemplary administrative interface display of a manage articles screen in accordance with an aspect of the present invention.
Figure 8:
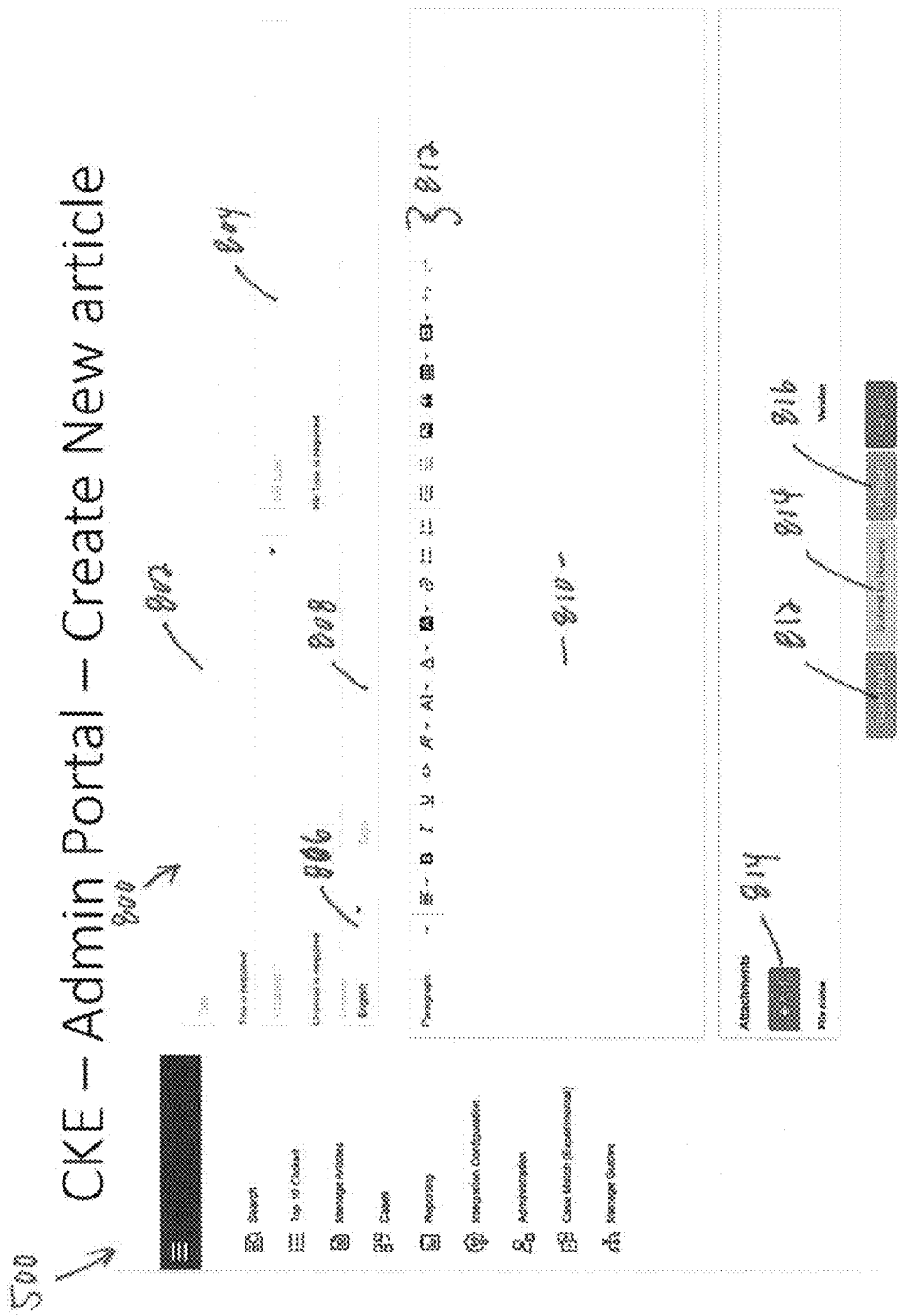
FIG. 8 is an exemplary administrative interface display of a new articles screen in accordance with an aspect of the present invention.

As best seen in FIG. 7, administrative interface 50 may include a manage article button 532 that when selected displays a window 700 that provides functionality to allow for the creation and management of articles within knowledge based articles data source 112. In particular, window 700 includes a new article button 702 that, when selected, is configured to navigate to a window 800 shown in FIG. 8. Window 800 includes data fields (or drop down menus) 802, 804, 806, 808 for entering a title of a new article, classifying the type of article, selecting the language of the article, and providing any tags. An article creation window 810 is displayed and allows for the entry of letters, words, phrases, numbers, links to other help content data sources, and any combination thereof to create an article. Various word processing functions 812 are also provided in window 810. Attachments can also be associated with the created article by selecting an add attachment button 814. After an article is created in article creation window 810, a save draft button 812 can be selected, which makes the created article accessible using a draft button 532 in FIG. 7. A submit for review button 814 may also be provided in window 800 that allows the created article to be reviewed by another administrator that has administrative access to suggest changes and approve the created article prior to publication in knowledge based articles 112. Any comments or suggested changes to the created article can be accessed using a review button 534 in FIG. 7. Once the created article is reviewed, a publish button 816 can be selected to make the article available within knowledge based articles 112 to be searched and accessed using cognitive knowledge platform 102. Referring back to FIG. 7, window 700 may further include an outdated button 536 may be selected to identifying one or more knowledge based articles as being outdated. Any of the outdated knowledge based articles can remain as being available to be searched within knowledge based articles 112 with an indication that the article is outdated, or the created article can be removed from knowledge based articles 112 so that it can no longer be searched.

Figure 9:
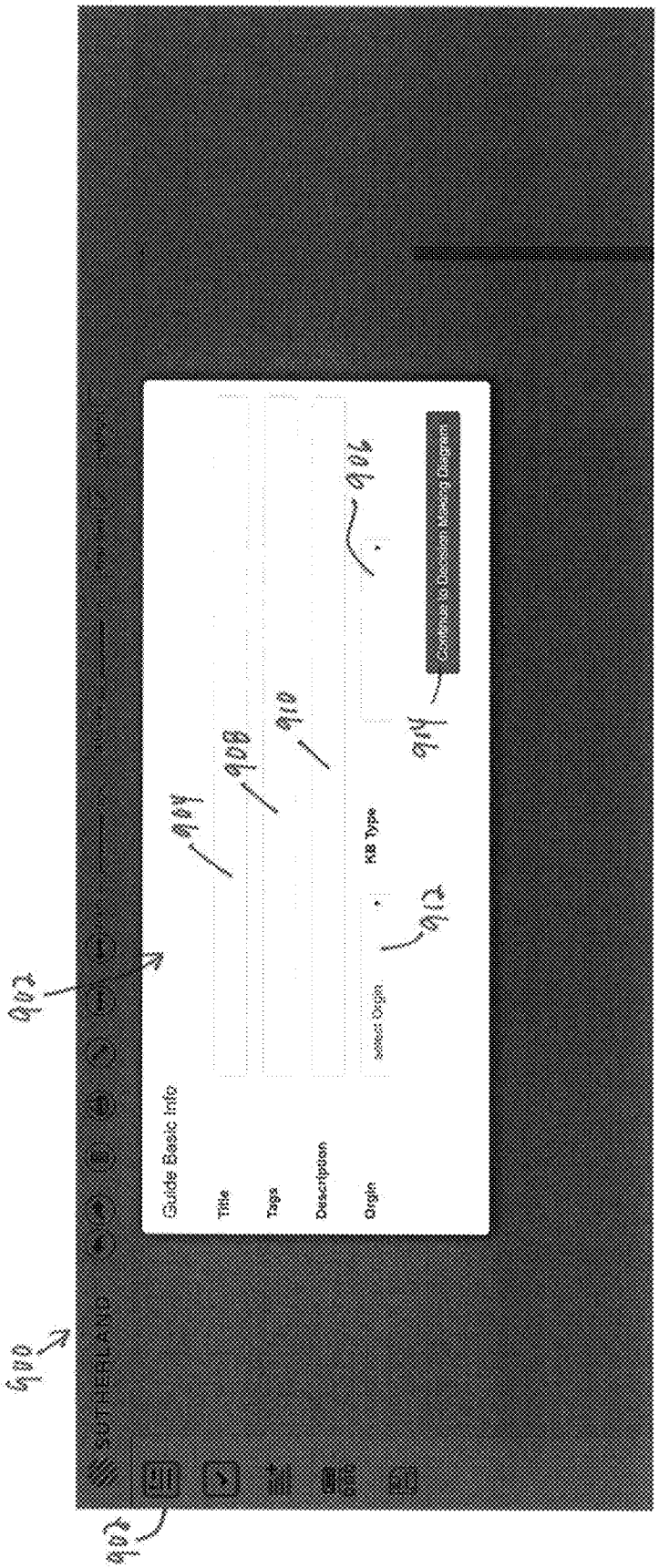
FIG. 9 is an exemplary administrative interface display of a new decision tree screen in accordance with an aspect of the present invention.

As best seen in FIG. 5, window 700 may further include a manage guides button 536 that when selected displays a window 900 shown in FIG. 9 that allows for the creation and management of one or more decision trees. In particular, window 900 includes a new decision tree button 902, which results in the display of another window 902. Window 902 includes data fields (or drop down menus) 904, 906, 908, 910, 912 for entering a title of a new decision tree, classifying the type of decision tree, providing any tags, description of the decision tree, and the origin of the decision tree. After this information is provided, a button 914 may be selected to allow for the creation of the decision tree using the tools and interface 1000 shown in FIG. 10.

Figure 10:
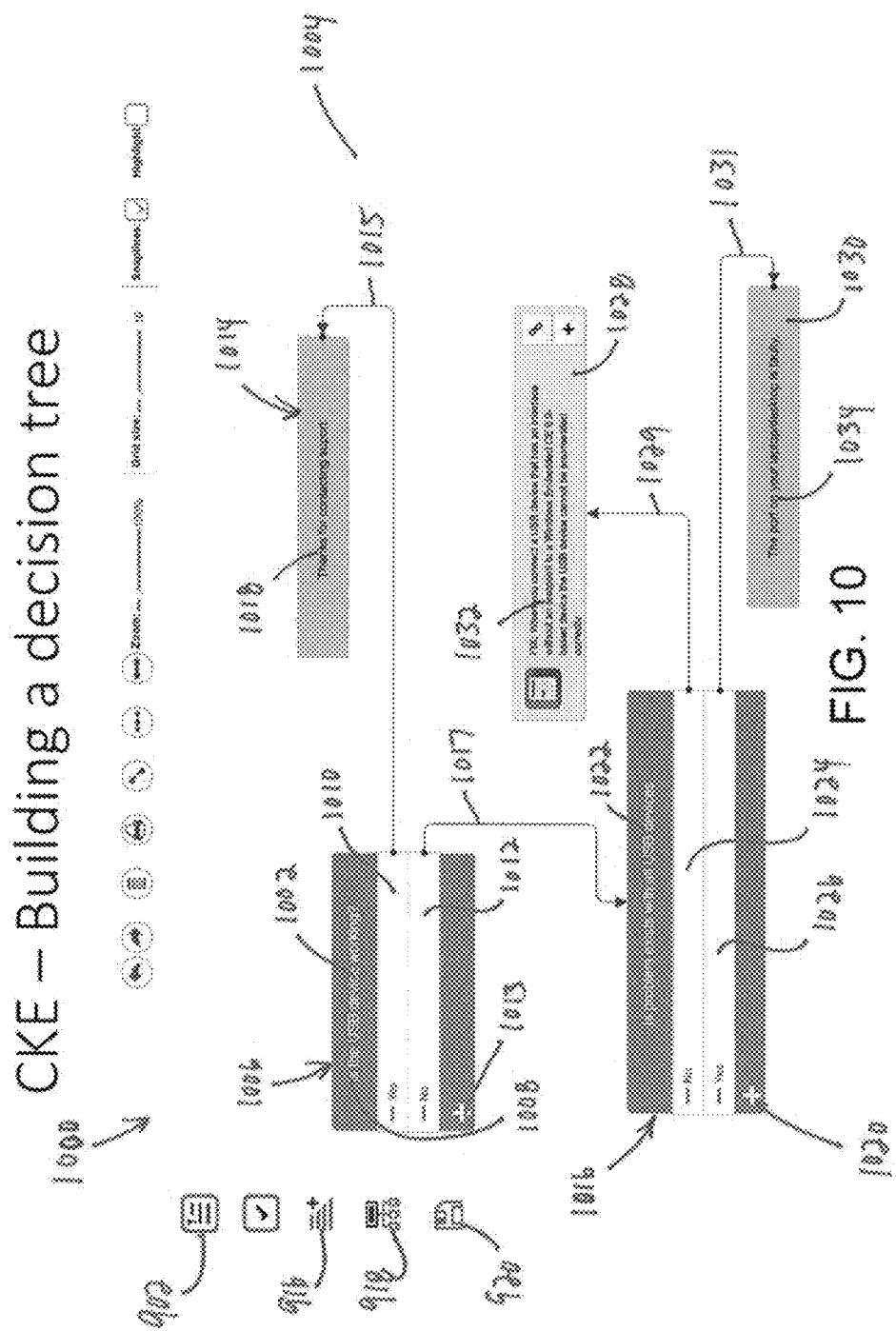
FIG. 10 is another exemplary administrative interface display of the new decision tree screen in accordance with an aspect of the present invention.

As best seen in FIG. 10, a decision tree can be started by selecting a button 916 which results in the display of a root node 1002 in a window 1004. Interface 1000 allows for the insertion of text representative of help content into the root node 1002, or the creation of a dynamic user selection interface 1006 in the root node 1002 that includes a question 1008 and presents at least a first answer 1010 and a second answer 1012 related to the question. It should be understood that any number of answers may be provided using a button 1013. Using a button 918, interface 1000 may further allow for the insertion of at least one leaf node 1014 connected with the first answer 1010 by a branch 1015, and at least one leaf node 1016 connected with the second answer 1012 by a branch 1017. Leaf node 1014 may allow for the insertion of information 1018 representative of help content into the leaf node 1014. Leaf node 1016 may allow for the insertion of information representative of help content into the leaf node 1016, or the creation of a dynamic user selection interface 1020 in the leaf node 1006 that includes a question 1022 and presents at least a first answer 1024 and a second answer 1026 related to the question. It should be understood that subsequent leaf nodes can continue to be added to any leaf node and be configured to include a dynamic user selection interface in the same manner as described above with reference to leaf node 1016. In this example, further leaf nodes 1028, 1030 connected with first and second answers 1024, 1026 using respective branches 1029, 1031. Leaf nodes 1028, 1030 allow for the insertion of information 1032, 1034 representative of help content into the respective leaf nodes 1028, 1030. It should be understood that any of root node 1002 or leaf nodes 1014, 1016, 1028, 1030 may allow for an insertion of an attachment or a link that is configured to provide access to help content data contained in the help content data source 114, other decision trees 110, or knowledge based articles 112. Further, a button 920 may be selected to save created decision tree in memory 108 and/or 120 to become available as help content in decision trees 110 for display on client 116.

Figure 11:
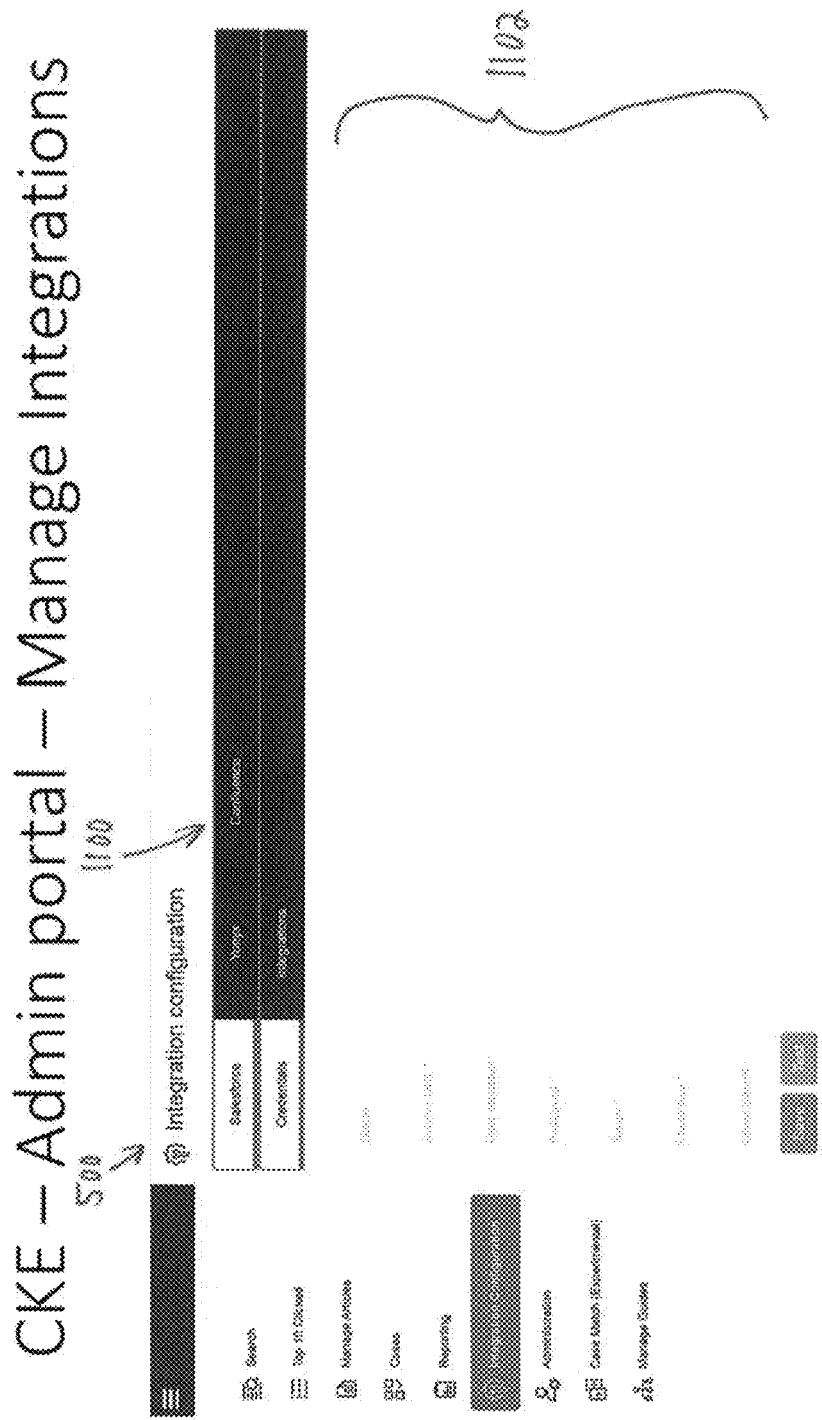
FIG. 11 is an exemplary administrative interface display of an integration management screen in accordance with an aspect of the present invention.

As best seen in FIG. 11, administrative interface 500 may include an integration configuration button 540 that when selected displays a window 1100 that provides functionality to allow cognitive knowledge platform 102 to access one or more help content data sources 114 that require the entry of access credentials 1102. Once access credentials 1102 are entered in the data fields set forth in window 1100, cognitive knowledge platform 102 will be permitted to access the help content set forth therein using system architecture 300 previously described.

Figure 12:
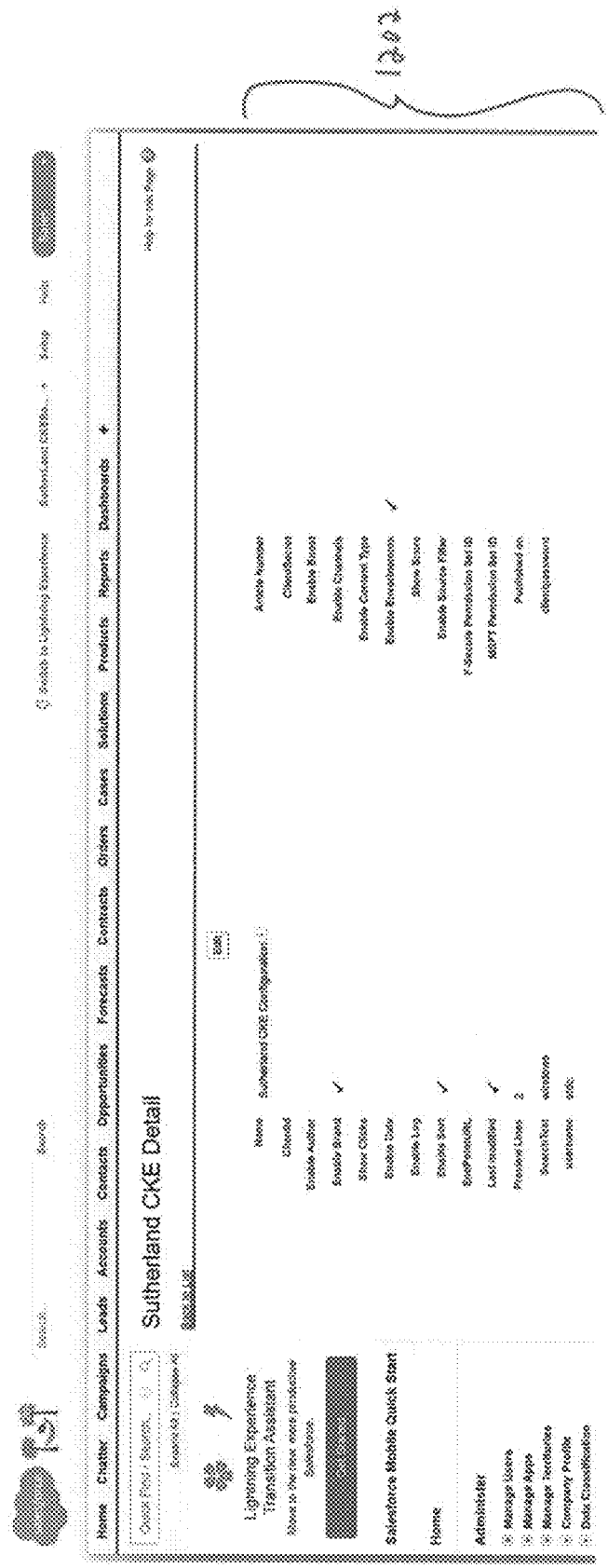
FIG. 12 is an exemplary interface display within a CRM application of a configuration screen for the cognitive knowledge platform in accordance with an aspect of the present invention.

As best seen in FIG. 12, an exemplary interface display 1200 is provided on a client 116 (e.g., CRM application—SALESFORCE) through integration with cognitive knowledge platform 102. Cognitive knowledge platform 102 includes computer executable instructions that allow for the configuration of a plurality of settings 1202 that allow the client 116 (e.g., CRM application) to log in (user name/password), enable certain functionality, specify certain help content data sources to be searched, enable certain filters, and otherwise integrate with the cognitive knowledge platform 102.

Figure 13:
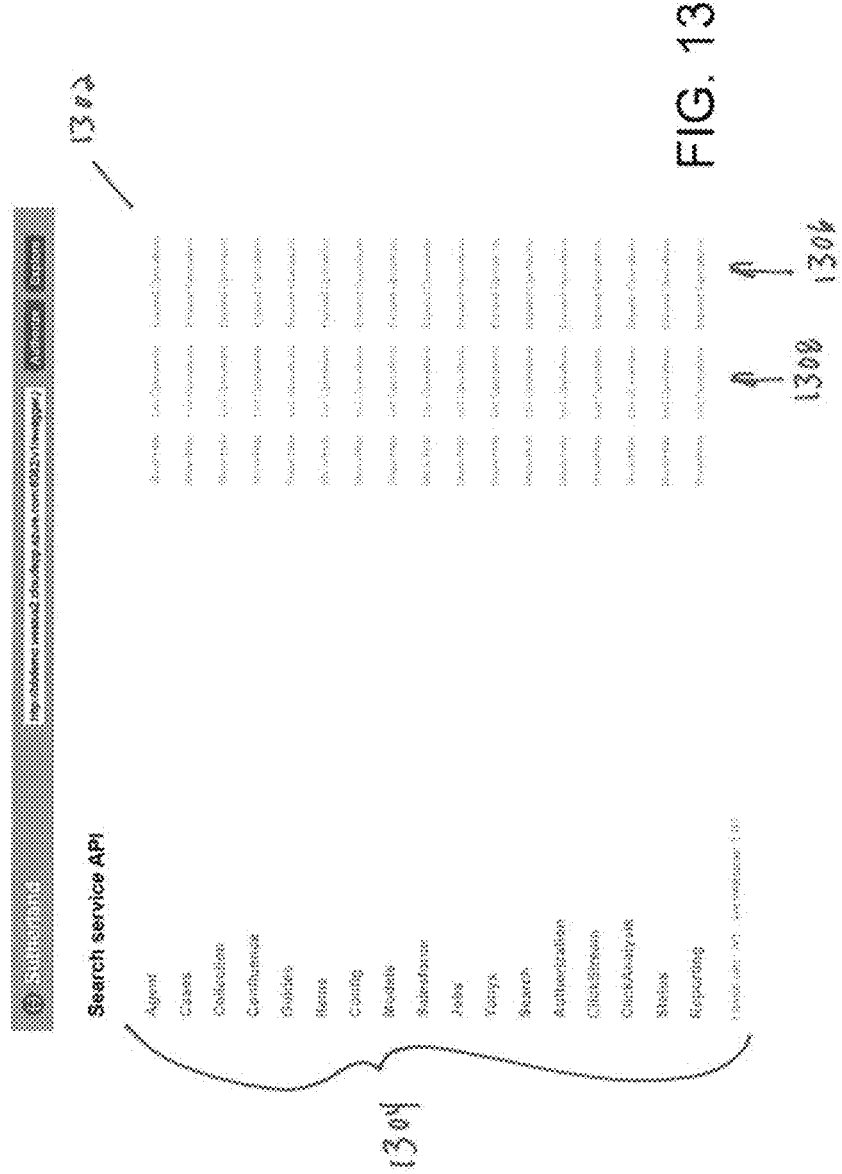
FIG. 13 is an exemplary interface display of an application program interface (API) portal in accordance with an aspect of the present invention.

As best seen in FIG. 13, cognitive knowledge platform 102 also allows an administrator or other authorized client 116 access to an application program interface (API) portal 1300. The window 1302 displayed lists one or more client applications 1304 that cognitive knowledge platform 102 is capable of integrating with, along with the ability to selectively designate the operations 1306 that are permitted to occur using cognitive knowledge platform 102. Window 1302 also provides the ability to list 1308 the operations that that are permitted to occur using cognitive knowledge platform 102.

Figure 14:
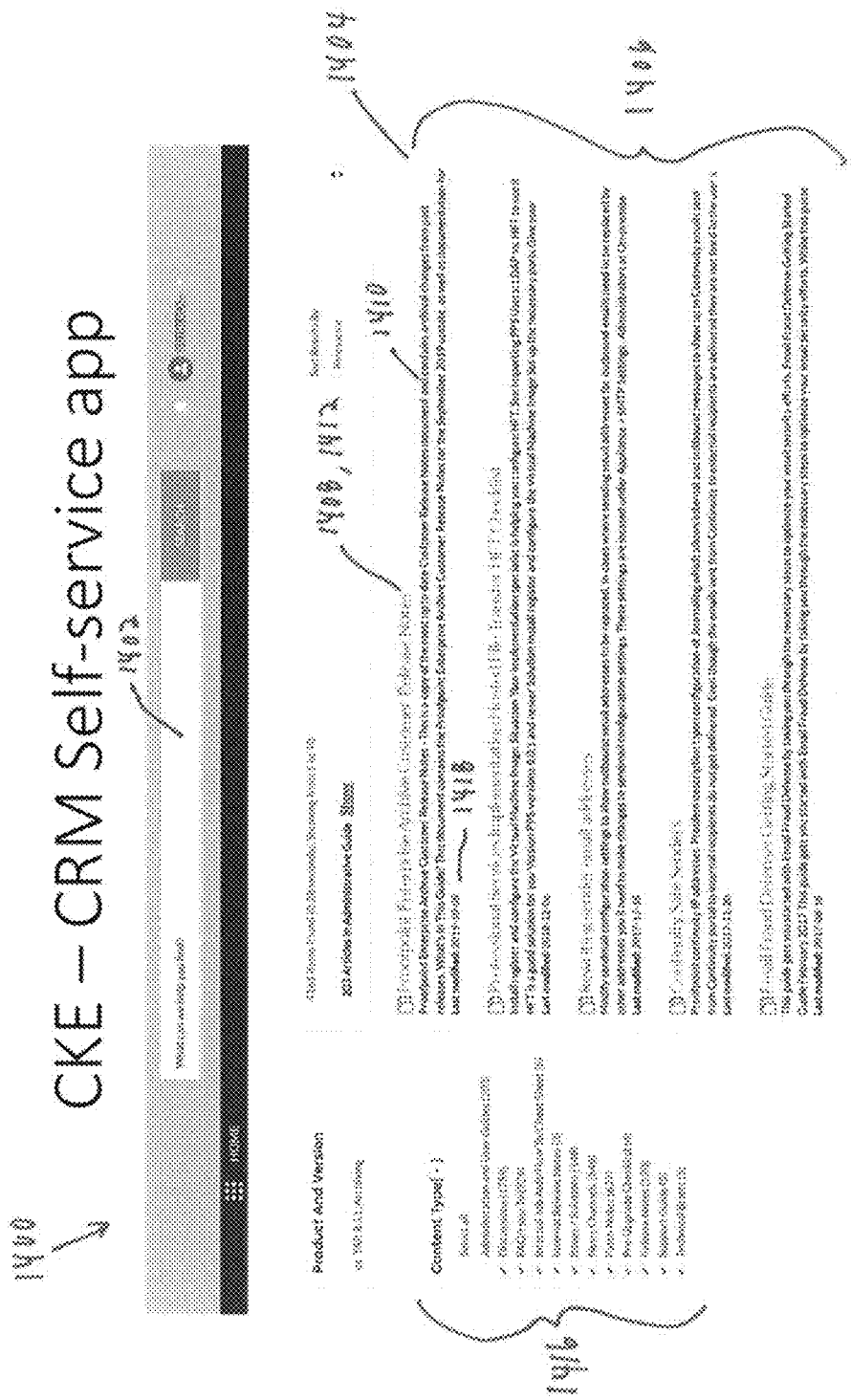
FIG. 14 is an exemplary interface display of a client home screen provided by cognitive knowledge platform in accordance with an aspect of the present invention.

As best seen in FIG. 14, a client interface 1400 may be provided by cognitive knowledge platform 102 to client 116 in the form of either a stand-alone software application offered either as downloadable computer executable instructions, or through server 104 via network 106 as non-downloadable computer executable instructions (e.g., software-as-a-service). It should be understood that either version of the computer executable instructions may be used through an integrated software applications, such as, but not limited to a CRM application. Referring to FIG. 14, window 1400 may include a search entry field 1402 that allows a user to enter one or more letters, words, phrases, numbers, symbols, or any combination (i.e., search terms) thereof in natural language, Boolean, or other format to locate help content located within help data content sources 114, decision trees 110, and/or knowledge based articles 112. As search terms are entered into search entry field 1402, cognitive knowledge platform 102 operates to use system architecture 300 to populate and display a search results window 1404 with one or more search results 1406. Each of the search results includes a title 1408 that identifies the help content and text 1410 that provides at least a portion of the help content from the help data content sources 114, decision trees 110, and/or knowledge based articles 112. It should also be understood that each of the search results 1406 may also include a link 1412 that may be selected to allow cognitive knowledge platform 102 to navigate directly to the help content located within help data content sources 114, decision trees 110, and/or knowledge based articles 112. Link 1412 may be embedded within title 1408, or it may be separate from title 1408. The search results 1406 can be sorted using a sort button 1414. There also may be a list 1416 including the help content data sources that were used to locate the search results, along with the ability to selectively enable (e.g., check boxes) any of the listed help content data sources to filter the search results 1406 that are presented in search window 1404. Other relevant information 1418 may also be provided with each search result 1406, such as, but not limited to the date the help content was last modified.

Figure 15:
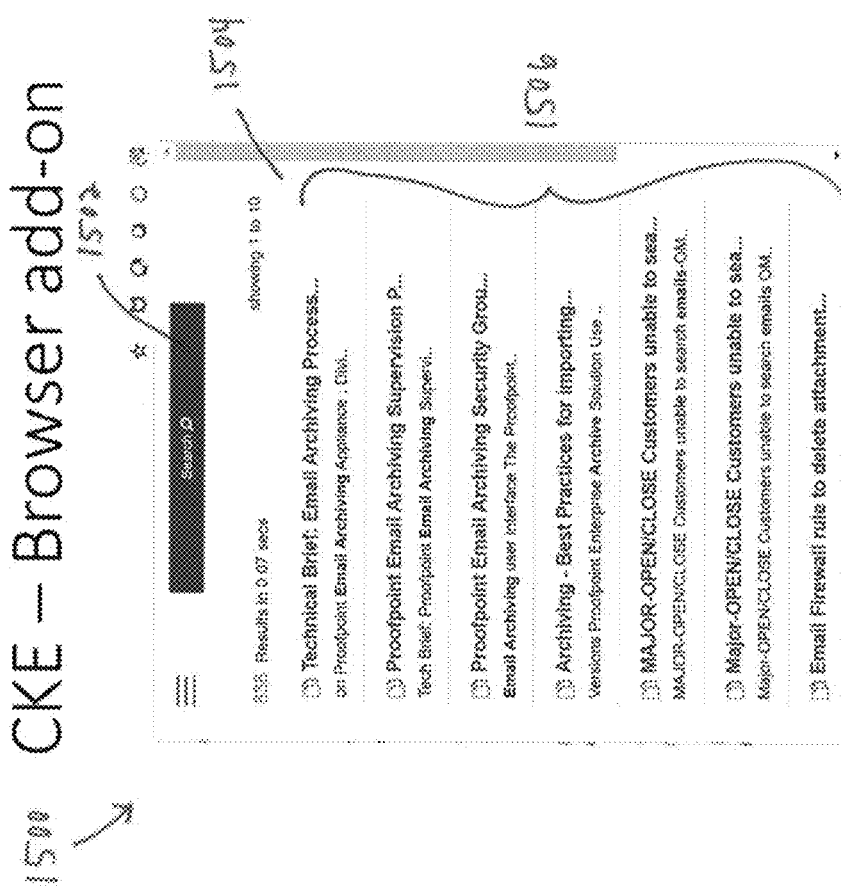
FIG. 15 is an exemplary interface display of an add-on window provided within an internet browser that allows access to cognitive knowledge platform in accordance with an aspect of the present invention.

As best seen in FIG. 15, cognitive knowledge platform 102 may also be in the form of computer executable instructions that takes the form of an add-on configured to integrate with an internet browser, which provides access to the functionality described herein through a window 1500. Window 1500 provides a search button that allows for the entry of search terms as previous described, as well as a search results portion 1504 that provides a list 1506 of the search results 1406 located using the search terms to locate help content within help data content sources 114, decision trees 110, and/or knowledge based articles 112.

Cognitive knowledge platform 102, can also be access through client 116, wherein client 116 is a help desk computing device (agent portal). Help desk computing device may be operated by a help desk agent that assists third parties with troubleshooting computer or any other issues. The help desk agent can receive inquiries from persons through telephone, chat, e-mail, text, or any other forms of communication. The help desk agent received information representative of the issue and then uses cognitive knowledge platform 102 to search and identify help content that may be useful to solve the issue presented, and then communicates a response to the third party using telephone, chat, e-mail, text, or any other forms of communication.

Figure 16:
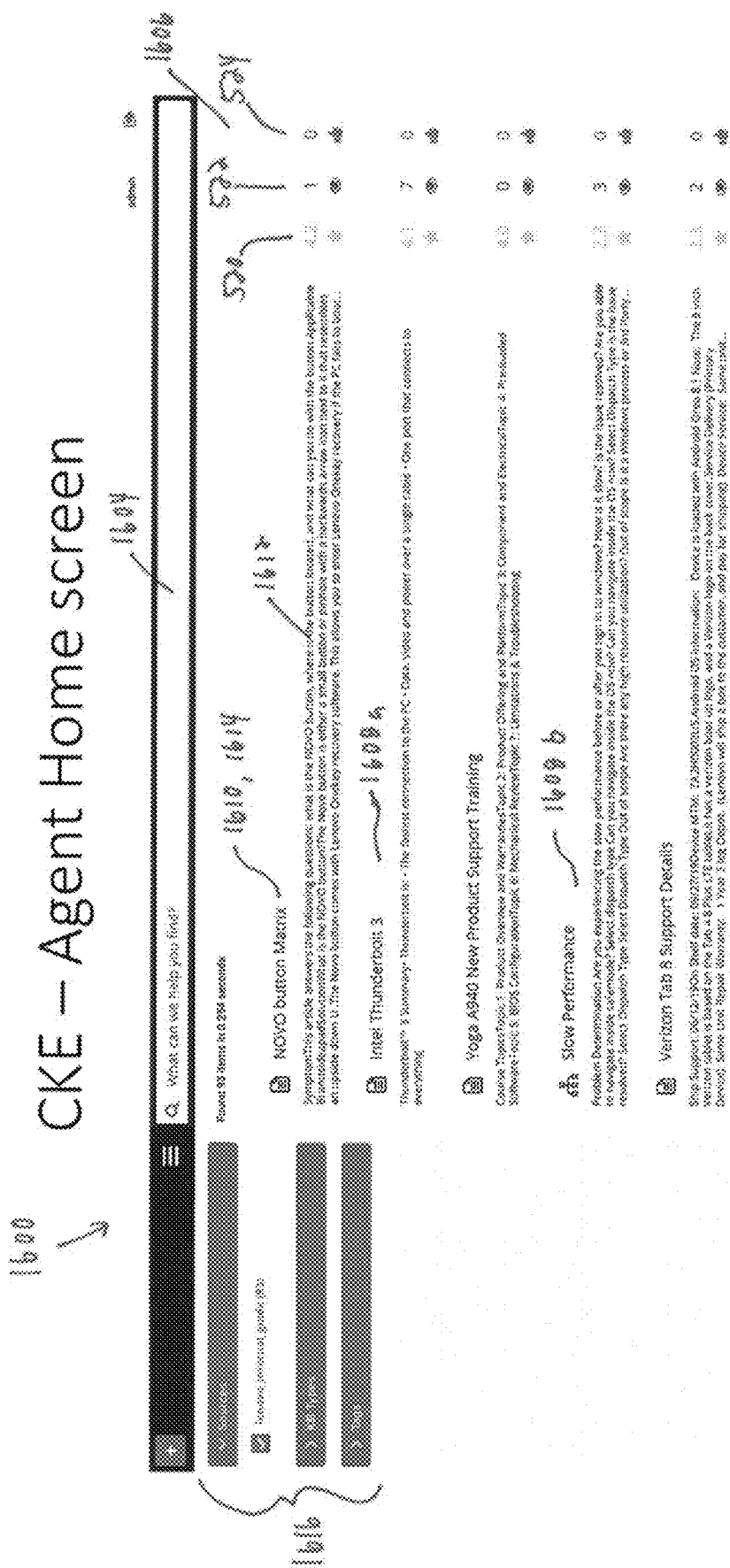
FIG. 16 is an exemplary interface display of an agent home screen provided by cognitive knowledge platform in an agent portal in accordance with an aspect of the present invention.

For example, as best seen in FIG. 16, a help desk agent interface 1600 may be provided by cognitive knowledge platform 102 to agent computing device (i.e., client 116) in the form of either a stand-alone software application offered either as downloadable computer executable instructions, or through server 104 via network 106 as non-downloadable computer executable instructions (e.g., software-as-a-service). Help desk agent interface 1600 may comprise a help desk home screen window 1602 including a search entry field 1604 that allows the help desk agent, after receiving information from the third party in relation to the issue to be solved, to enter one or more letters, words, phrases, numbers, symbols, or any combination (i.e., search terms) thereof in natural language, Boolean, or other format to locate help content located within help data content sources 114, decision trees 110, and/or knowledge based articles 112. As search terms are entered into search entry field 1604, cognitive knowledge platform 102 may operate to use system architecture 300 to populate and display a search results window 1606 with one or more search results 1608. Each of the search results 1608 includes a title 1610 that identifies the help content and text 1612 that provides at least a portion of the help content from the help data content sources 114, decision trees 110, and/or knowledge based articles 112. It should also be understood that each of the search results 1608 may also include a link 1614 that may be selected to allow cognitive knowledge platform 102 to navigate directly to the help content located within help data content sources 114, decision trees 110, and/or knowledge based articles 112. Link 1614 may be embedded within title 1610, or it may be separate from title 1610. The search results 1608 may be sorted using the features 1616 provided in window 1602 based on the help content data sources and/or tags that are associated with the search results 1608. Each search result 1608 may also include relevancy rating 520, counter 522 to identify how many times the search result has been selected, and indicator 524 to signify that the article was liked by a user of cognitive knowledge platform 102. Each of these items 520, 522, and 524 can be used to sort the search results 512.

Figure 17:
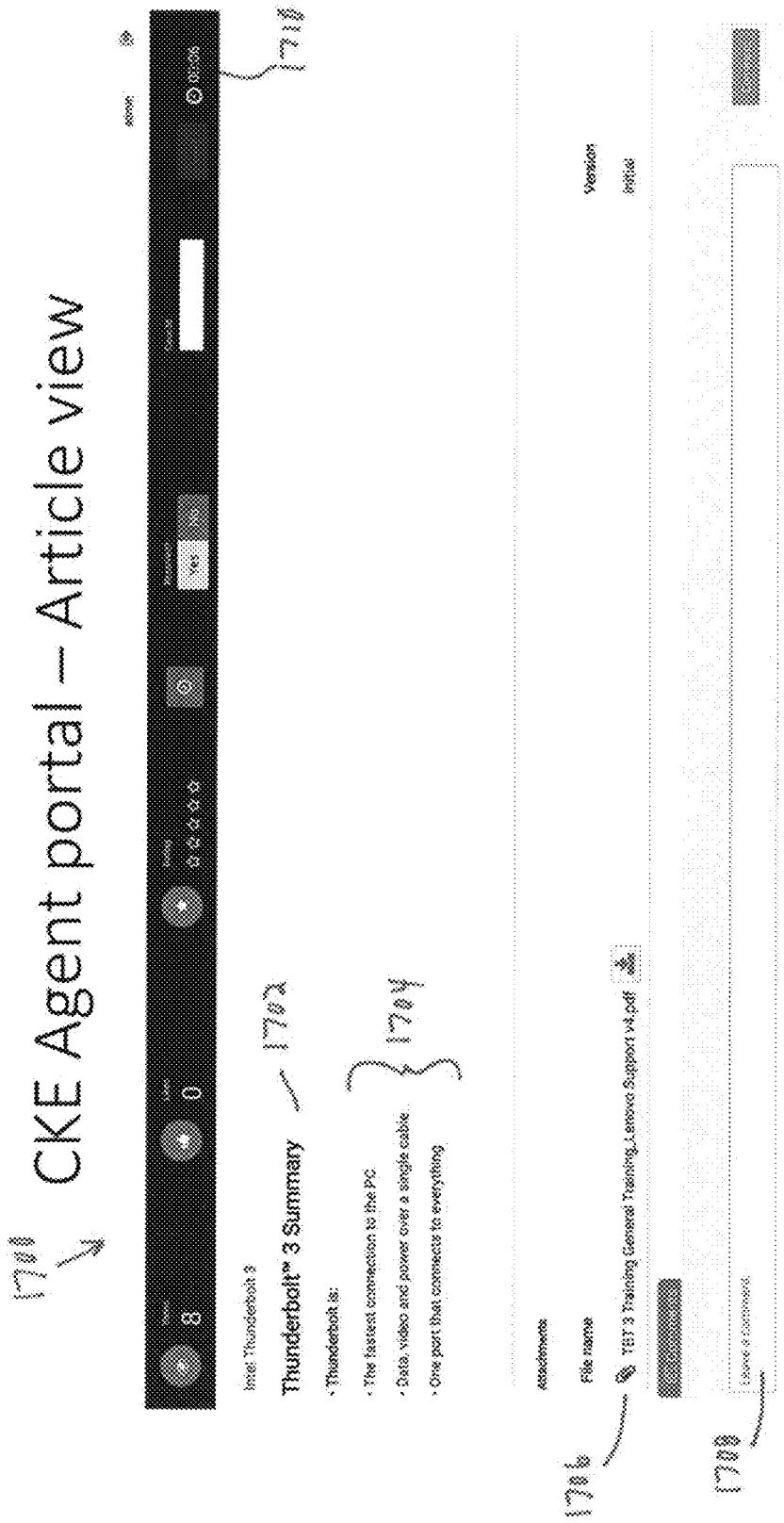
FIG. 17 is an exemplary interface display when an agent selects one of the search results provided in FIG. 16 in accordance with an aspect of the present invention.

FIG. 17 is an exemplary interface 1700 that is displayed on an agent computing device (i.e., client 116) when one of the search results 1608a (FIG. 16) is selected using a user selection device. Interface 1700 may include one or more of a title 1702 of the help content, a summary of the help content, a list of one or more attachments 1706 that can be accessed, viewed, downloaded and/or sent to a third party by agent. There is also an entry field 1708 that may be populated with comments that will be associated with the search result 1608a so that such comment can be viewed if the search result 1608a is selected in the future. Interface 1700 also displays the number of views and likes for the search result 1608a, and is configured to allow the agent to rate the help content within the search result 1608a, provide an yes/no recommendation and enter a custom case ID if desired. Cognitive knowledge platform 102 is also configured for timing how long a search result 1608*a* is being viewed using a timer 1710.

Figure 18:
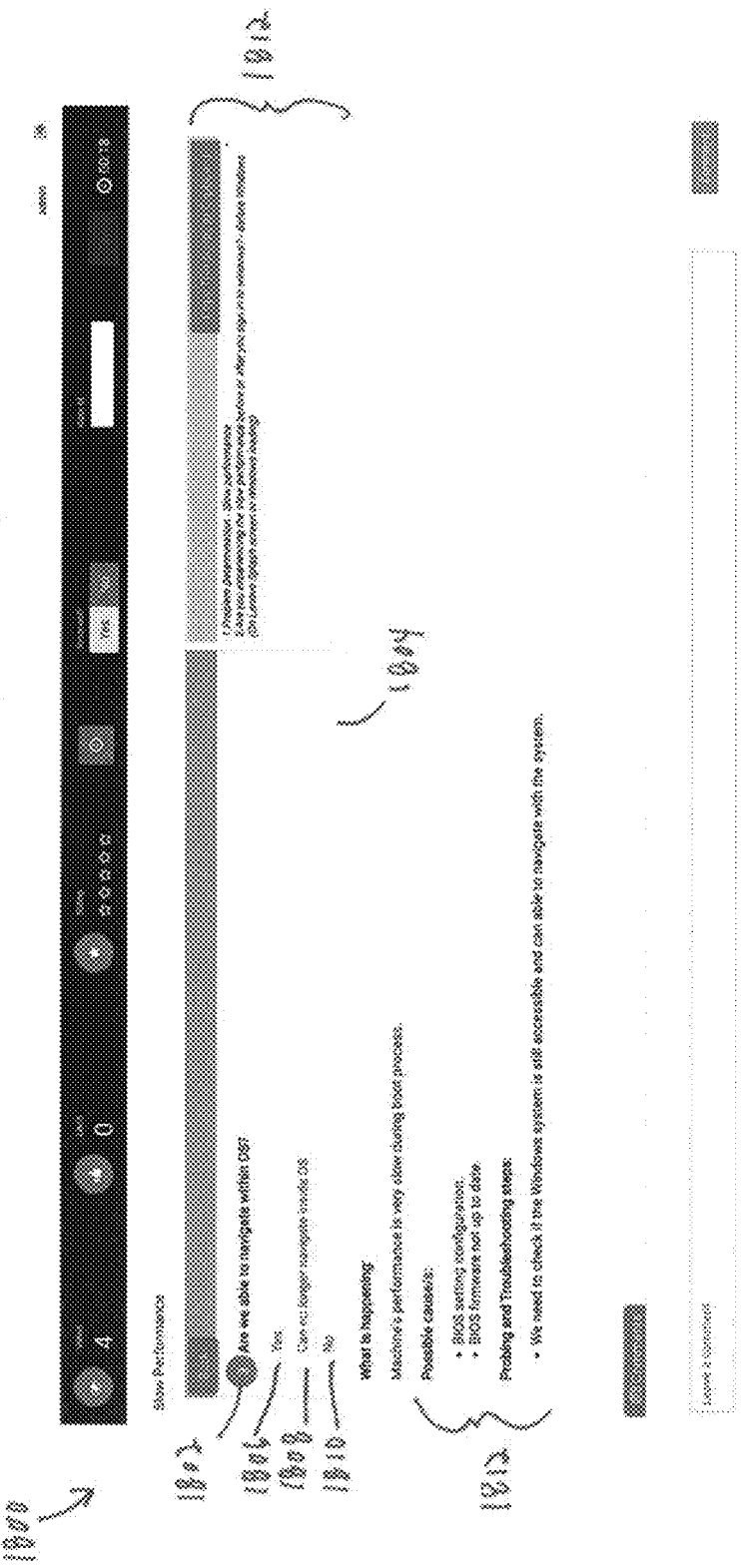
FIG. 18 is an exemplary interface display when an agent selects another one of the search results provided in FIG. 16 in accordance with an aspect of the present invention.

FIG. 18 is another exemplary interface 1800 that may be displayed on an agent computing device (i.e., client 116) when one of the search results 1608*b* (FIG. 16) is selected using a user selection device. In this example, search result 1608*b* is a decision tree stored in the decision trees 110 repository, that may be created using the methodology discussed with respect to FIGS. 9 and 10. Interface 1800 may include a sequential display of the various steps of the decision tree starting with the root node, and followed by subsequent respective leaf nodes, depending on the answers that are selected within the decision tree, resulting in the display of help content related to the search criteria and issue to be resolved. In particular, FIG. 18 shows one of a plurality of steps (third step 1802) within the selected decision tree, which in this case is a dynamic user selection interface 1804 that includes a question 1804 and a plurality of answers 1806, 1808, 1810 related to the question 1804. Interface 1800 also includes help content 1812 that may be viewed by agent and communicated to the third party. When an interface selection device is used to select one of the answers 18096, 1808, 1810, cognitive knowledge platform 102 operates to display a subsequent user interface, similar to interface 1800, except relating to the next respective step in the decision tree. It should be understood that this same decision tree functionality described above can be implemented during through the administrative portal or any client 116 without being used in the context of a help desk agent.

Figure 19:
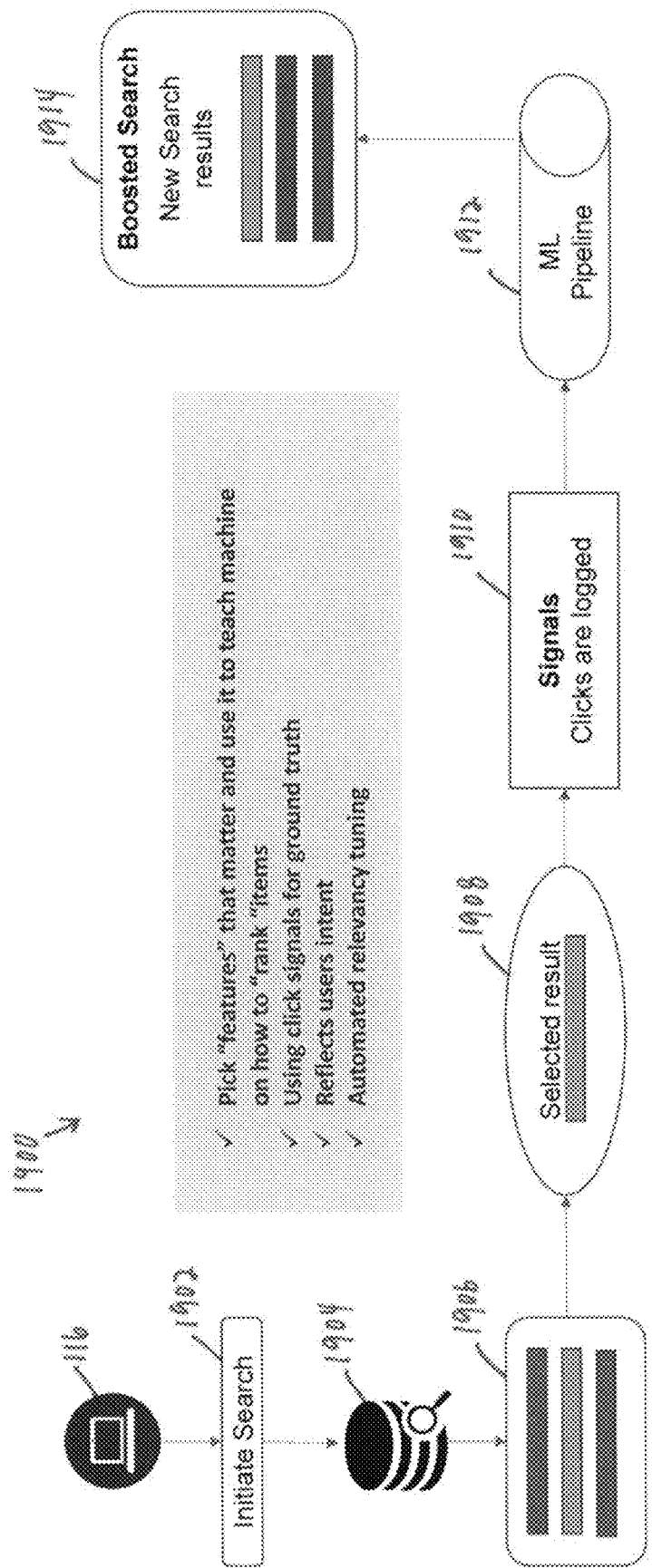
FIG. 19 is an exemplary flow chart showing self-learning functionality included within the cognitive knowledge platform in accordance with an aspect of the present invention.

As previously described, the search results provided by cognitive knowledge platform 102 can be ranked based at least in part on relevancy score 520 (FIG. 5), which can be modified based on a boost factor 610*a* (FIG. 6). The boost factor 610*a* is a selected weight provided to a particular search result based on the number of times that a particular search result has been selected (clicked) when it shows up in a list of search results within cognitive knowledge platform 102. Therefore, the more a particular search result is selected, the more likely it is that the search result included help content that was helpful to address a particular issue that was the subject of an inputted search. FIG. 19 is a flow chart showing a process 1900 for utilizing one aspect of the machine learning module 304 (FIG. 3) of cognitive knowledge platform 102 to assist with providing relevant search results to a user of the system using the boost factor 610*a*. At step 1902, client 116 or help desk computing device 118 may be used to initiate a search by entering search criteria in search entry field 508,1402, 1502 at which time the cognitive knowledge engine 102 is used to search help content data sources 114, decision trees 110, and knowledge based articles 112 at step 1904 to provide list of search results 512, 1406, 1506 at step 1906. One of the search results is selected at step 1908, wherein the selection (e.g., click) of the search result is logged in memory 310 at step 1910. The logged selection of the particular search result, along with any additional previously logged selections of the particular search result, forms a cumulative selection number (e.g., total number of clicks) that is utilized by machine learning module 304 at step 1912 and associated with a specified boost factor 610*a* (e.g., 0.5 boost factor) to provide an enhanced (e.g., increased) relevancy score for the search result. The enhanced relevancy score will then be used with respect to the particular search result when a subsequent search is performed where the boosted search result appears in the search results window, whereby the boosted search result will be ranked higher than its previous ranking, as set forth in step 1914.

Figure 20:
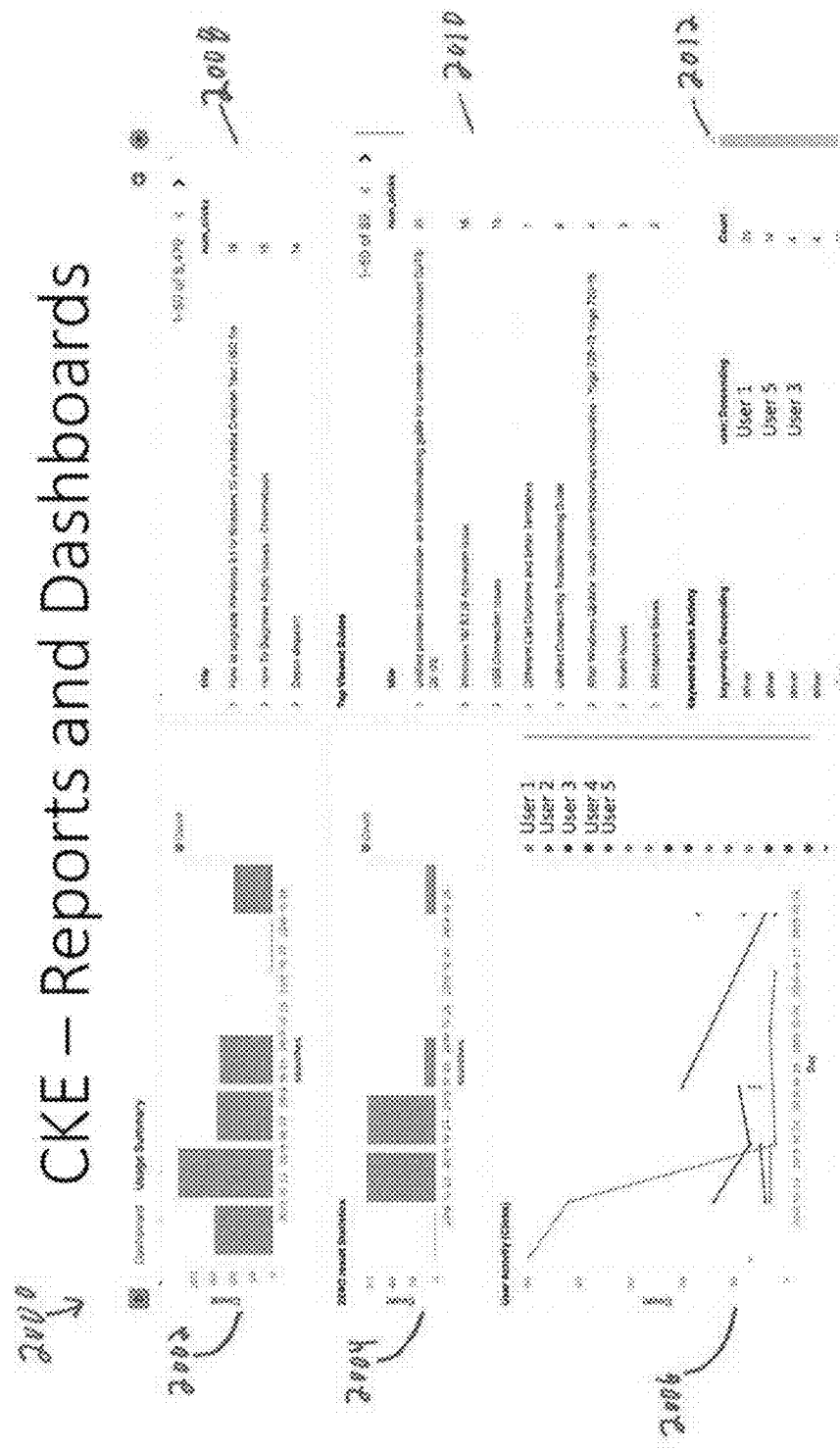
FIG. 20 is an exemplary interface display showing certain reports and dashboards based on the use of the cognitive knowledge platform in accordance with an aspect of the present invention.

FIG. 20 is an exemplary interface display 2000 showing certain reports and dashboards that may be accessed through the administrator portal based on the use of the cognitive knowledge platform 102. The reports and dashboards can include information related to the summary of usage 2002 of cognitive knowledge platform 102, number of times a search rendered zero search results 2004, user activity based on the number of user selections (clicks) 2006, rank order of search results based on number of selections 2008, rank order of top viewed guides contained within search results 2010, and the top searched terms entered 2012 by users of cognitive knowledge platform 102. This information can be useful to identify how cognitive knowledge platform 102 is being used on an enterprise level and to potentially identify frequently used help data sources in an efficient manner that may be helpful to a user of client 116.

Figure 21:
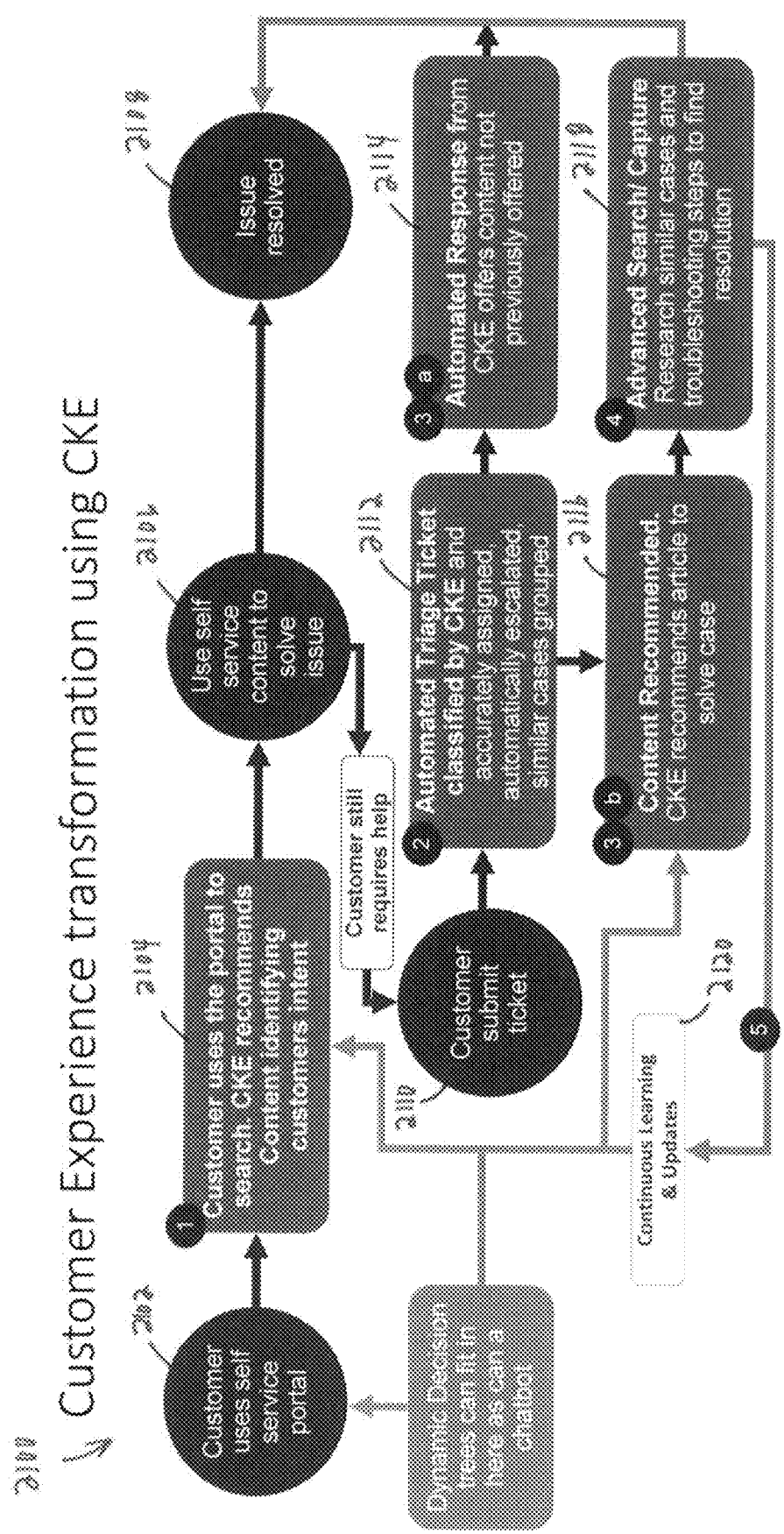
FIG. 21 is a flow chart showing a process of client using cognitive knowledge platform with an aspect that includes submitting a help ticket to assist with resolving an issue.

In another aspect, cognitive knowledge platform 102 may allow client 116 to submit a help ticket to resolve an issue of the retrieved search results do not resolve the issue. For example, as shown in FIG. 21, a customer accesses cognitive knowledge platform 102 at step 2102 to conduct a search related to an issue that needs to be resolved. As previously described, cognitive knowledge platform 102 recommends help content in the form of a list of search results based on the search criteria entered at step 2104. The search results can then be selected to provide access to help content to assist with resolving the issue at step 2106. The issue can then either be resolved at step 2108, or if the search results did not provide access to help content to resolve the issue, then a service/help ticket can be submitted or otherwise communicated to cognitive knowledge platform 102 at step 2110. The service tickets/help tickets may be submitted on the customer portal. Cognitive knowledge platform 102 has the capability to interface with self-service portal or similar technologies. At step 2112, an automated triage ticket is classified by cognitive knowledge platform 102, and accurately assigned, automatically escalated (assigned as a high priority), and similar cases are grouped. The case classification uses cognitive knowledge platform's 102 "supervised" machine learning capability to classify tickets using the historical data of how tickets are classified. Thereafter, either an automated response may be provided by cognitive knowledge platform 102 at step 2114 to offer help content not previously offered, or help content (such as an article) is recommended to resolve the issue at step 2116. Each interaction with cognitive knowledge platform 102 is recorded and it uses the previous interactions and the results to offer content that was previously not offered.

From either step 2114 or 2116, advanced research is performed to seek out similar cases and troubleshooting steps to identify a resolution at step 2118. The outcome of the recommendations and research performed is used to update the help content within help content data sources 114 and knowledge based articles 112, as well as in the machine learning module 304, at step 2120. Cognitive knowledge platform 102 may then operate to return to step 2104. Dynamic decision trees 110, chat bots and other clients 116 can be included in the flow process as well.

Figure 22:
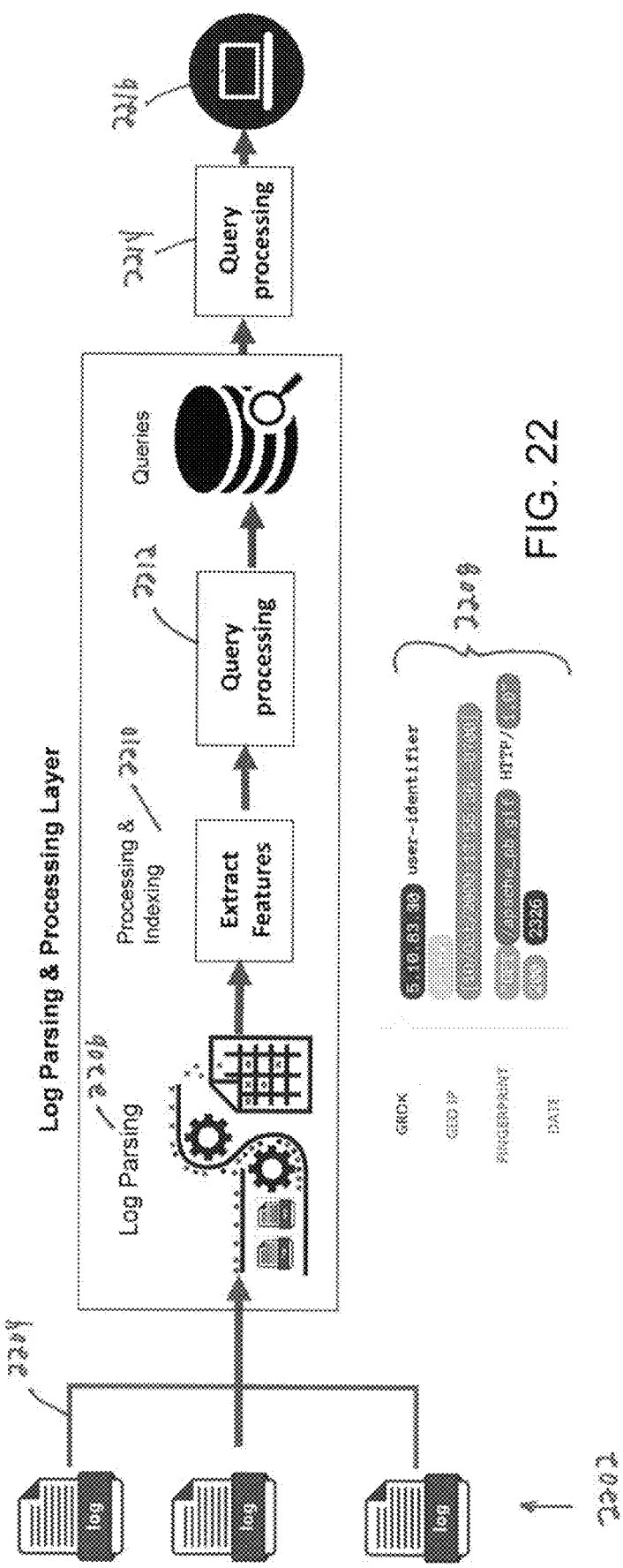
FIG. 22 is a flow chart showing another exemplary method that may be performed using the cognitive knowledge platform to perform log analytics in accordance with an aspect of the present invention.
Figure 23:
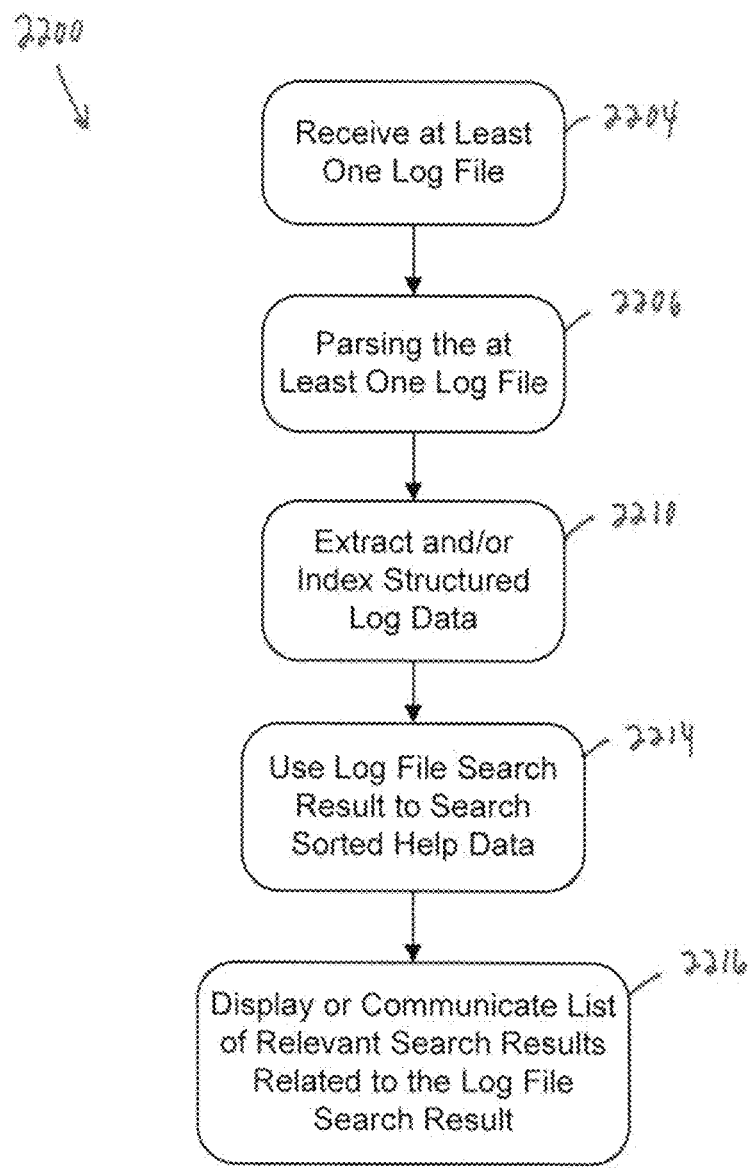
FIG. 23 is a schematic drawing showing aspects of the method set forth in FIG. 22.
Figure 24:
FIG. 24 is an exemplary administrator user interface for using the cognitive knowledge platform to perform log analytics in accordance with an aspect of the present invention.

With reference to another exemplary method 300 shown in FIGS. 22 and 23, cognitive knowledge platform 102 may include computer readable instructions configured for performing log analytics on log files from a computer operating system or application logs to provide manual or automatic recommendation of help content to assist with solving issues with the log entries. For example, method 2200 is configured to receive or otherwise ingest at least one log file 2202 at step 2204, wherein each log file 2202 includes a plurality of log entries 2206 (FIG. 24) including unstructured log data. FIG. 24 shows an exemplary administrator user interface display 2400 including a cases button 2402 that provides for the display of a plurality of cases 2404 wherein a plurality of log files 2202 have been received by cognitive knowledge platform 102, wherein the log files include a plurality of log entries. Referring back to FIGS. 22 and 23, the cognitive knowledge platform 102 is configured for parsing the at least one log file 2202 at step 2206 to change the unstructured log data into structured log data 2208. The structured log data 2208 is then extracted and/or indexed at step 2210 to allow for the structured data to be searched and/or filtered to identify a log file search result at step 2212. The log file search result may then be used to search the sorted help data at step 2214. The list of relevant search results related to the log file search result may then be automatically displayed or otherwise communicated using client 116, at step 2216.

Having described one embodiment of the cognitive knowledge platform and associated methods, an exemplary computer environment for implementing the cognitive knowledge platform is presented next.

Figure 25:
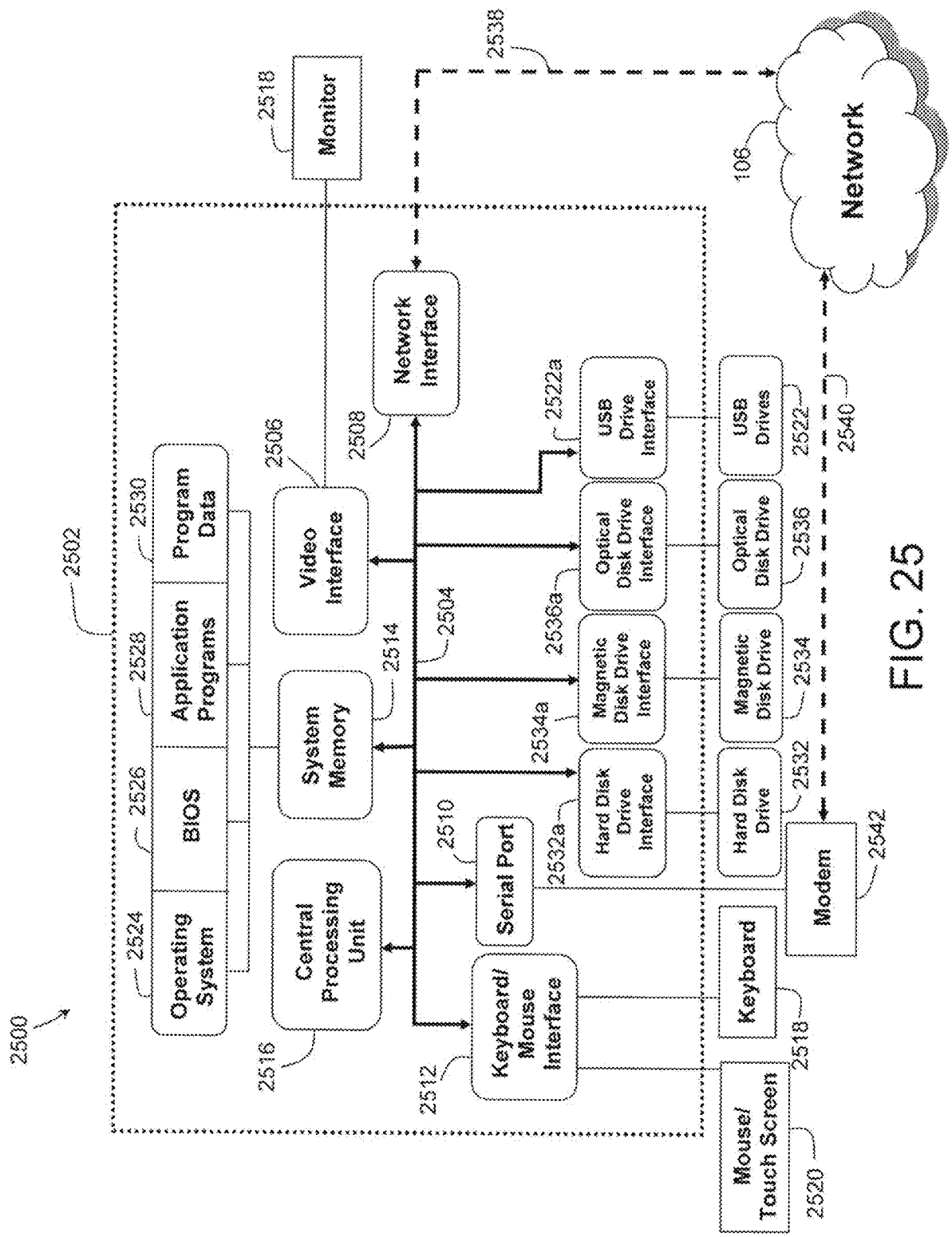
FIG. 25 is a schematic diagram generally illustrating a computing environment in which the cognitive knowledge platform may be implemented.

FIG. 25 shows an exemplary computing environment 2500 that may be used to implement any of the processing of computer-executable instructions thus far described. Computing environment 2500 may be a computer 2502 that is representative of server 104, client 116, administrative computing device 118, or any other computer device previously described. For example, computer 2502 may include a system bus 2504 that couples a video interface 2506, network interface 2508, one or more serial ports 2510, a keyboard/mouse interface 2512, and a system memory 2514 to a Central Processing Unit (CPU) 2516. A monitor or display 2518 is connected to bus 2504 by video interface 2506 and provides the user with a graphical user interface to input of search criteria, navigating through the interfaces previously described, displaying help content, and performing any other relevant functions previously described during the use of cognitive knowledge platform 102, for example. The graphical user interface allows the user to enter commands and information into computer 2502 using a keyboard 2518 and a user interface selection device 2520, such as a mouse, touch screen or other pointing device. Keyboard 2518 and user interface selection device 2520 are connected to bus 2504 through keyboard/mouse interface 2512. Display 2518 and user interface selection device 2520 are used in combination to form the graphical user interface which may allow the user to implement at least a portion of the processes described above with respect to the cognitive knowledge platform 102. Other peripheral devices may be connected to computer through serial port 2510 or universal serial bus (USB) drives 2522 to transfer information to and from computer 2502.

The system memory 2514 is also connected to bus 2504 and may include read only memory (ROM), random access memory (RAM), an operating system 2524, a basic input/output system (BIOS) 2526, application programs 2528 and program data 2530. Memory 2514 may also represent memory 108 and 310. The computer 2502 may further include a hard disk drive 2532 for reading from and writing to a hard disk, a magnetic disk drive 2534 for reading from and writing to a removable magnetic disk (e.g., floppy disk), and an optical disk drive 2536 for reading from and writing to a removable optical disk (e.g., CD ROM or other optical media). The computer 2502 may also include USB drives 2522 and other types of drives for reading from and writing to flash memory devices (e.g., compact flash, memory stick/PRO and DUO, SD card, multimedia card, smart media xD card). A hard disk interface 2532a, magnetic disk drive interface 2534a, an optical drive interface 2536a, and a USB drive interface 2522a operate to connect bus 2504 to hard disk drive 2532, magnetic disk drive 2534, optical disk drive 2536, and USB drive 2522, respectively. Each of these drive components and their associated computer-readable media may provide computer 2502 with non-volatile storage of computer-readable instruction, program modules, data structures, application programs, an operating system, and other data for the computer 2502. In addition, it will be understood that computer 2502 may also utilize other types of computer-readable media in addition to those types set forth herein, such as digital video disks, random access memory, read only memory, other types of flash memory cards, magnetic cassettes, and the like.

As mentioned above, the cognitive knowledge platform 102 may be implemented in a networked environment using logical connections to establish communication between server 104, client 116, administrative computing device 118, and help content data sources 114, as previously described. Network interface 2508 provides a communication path 2538 between bus 2504 and network 106, which allows the instructions, data, sequences, files, designations, notifications, or information described above (for example, but not limited to, any information or data that is representative of help content, log files, or other information previously described) to be communicated through network 106 between server 104, memory 108, client 116, administrative computing device 118, help content data sources 114, decision trees 110, knowledge based articles 112 and/or memory 118, 310 using computer 2502, as described above. This type of logical network connection is commonly used in conjunction with a local area network (LAN). The instructions, data, sequences, files, designations, notifications, or information may also be communicated from bus 2504 through a communication path 2540 to network 106 using serial port 2510 and a modem 2542. Using a modem connection is commonly used in conjunction with a wide area network (WAN). It will be appreciated that the network connections shown herein are merely exemplary, and it is within the scope of the present invention to use other types of network connections between server 104, memory 108, client 116, administrative computing device 118, help content data sources 114, decision trees 110, knowledge based articles 112 and/or memory 118, 310 including both wired and wireless connections.

As can be appreciated, the cognitive knowledge platform and associated system and methods described above overcomes the previously mentioned drawbacks and deficiencies that currently exist in this field by providing an cognitive knowledge platform that allows for the creation of knowledge based articles, and a workflow for creation, edits and approvals of such knowledge base articles. The platform also allows for the creation of decision trees independently or by combining knowledge base articles from third party help content data sources over a network and those created using the platform. Further, the platform provides an integrated approach to allow for searching and access to a plurality of third party help content data sources, along with the decision trees and knowledge based articles created using the platform. The platform further provides a method for log analytics that ingests and parses log files from operating systems and application logs that make the data more structured for analysis. Flexible querying and filtering pf parsed log data is provided for faster analysis. Automatic recommendation of articles including help data is provided to solve issues in log entries. Machine learning (artificial intelligence) is also provided to automatically correlate knowledge base contents and identify similar tokens to associate them. Key phrases are combined with content on the public internet to create/curate synonyms automatically. Bigrams and trigrams are also identified and used in the methodology described herein. Knowledge based articles are recommended using search terms and received service tickets, and case triage is conducted automatically using case data, usage, and other available information. Relevancy scoring is also provided to rank the search results to provide relevant search results to resolve the issue related to the search terms entered into the platform. Other benefits are also provided which have been described herein.

From the foregoing, it will be seen that this invention is one well adapted to attain all the ends and objects hereinabove set forth together with other advantages which are obvious and which are inherent to the system and method. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement. Further, it should be understood that the use of the terms "module" and "component" herein are interchangeable and shall have the same meaning.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A system including a cognitive knowledge platform for accessing help content data from a plurality of help content data sources, wherein the plurality of help content data sources includes a first group of help content data sources and a second group of help content data sources, the system comprising:
a server comprising a memory and a processor, wherein the server is in communication with the first group of help content data sources over a network, wherein the second group of help content data sources is stored in the memory of the server and includes one or more decision trees and one or more knowledge-based articles, wherein each of the one or more decision trees include a root node, at least two leaf nodes, and a branch connecting the root node to the at least two leaf nodes, wherein the root node and the at least two leaf nodes provide for the display of the help content data, wherein the processor is configured for executing computer-executable instructions stored in the memory comprising:
allowing for an insertion of an attachment or a link into at least one of the at least two leaf nodes of the one or more decision trees,
locating the help content data by searching the first group of help content data sources over the network and the second group of help content data sources including the one or more decision trees and the one or more knowledge-based articles stored in the memory of the server,
sorting the located help content data so that the located help content data is searchable, and
allowing the sorted help content data to be searched so that a list of relevant search results are displayed on a computing device, wherein each search result within the list of relevant search results includes access to the help content data,
wherein the attachment or the link inserted into the at least one of the at least two leaf nodes of the one or more decision trees is configured to provide access to the help content data contained in at least one of the first group of help content data sources over the network, another one of the decision trees or one of the knowledge-based articles stored in the memory of the server.

2. The system in accordance with claim 1, wherein the first group of help content data sources includes at least one of website pages, blogs, chat bots, chat data, knowledge-based applications, customer relationship management (CRM) applications, email data, discussion forums, self-help portals, data lakes, and enterprise data sources.

3. The system in accordance with claim 1, wherein the help content data can be at least one of website content, data files, videos, pictures, text, instructions, links, attachments, flow charts, or other help related information.

4. The system in accordance with claim 1, wherein the access to the help content data includes providing at least one of a link to access the respective help content data source or displaying information from the respective help content data source.

5. The system in accordance with claim 1, wherein the computer-executable instructions further include allowing for the creation of the one or more knowledge-based articles.

6. The system in accordance with claim 5, wherein the computer-executable instructions further include allowing for a document to be attached to the one or more knowledge-based articles.

7. The system in accordance with claim 1, wherein the computer-executable instructions further include allowing for the creation of the one or more decision trees.

8. The system in accordance with claim 1, wherein the server is configured for receiving at least one log file, wherein each log file includes a plurality of log entries including unstructured log data, wherein the computer-executable instructions are configured for:
parsing the at least one log file to change the unstructured log data into structured log data,
allowing the structured log data to be indexed to allow for the structured data to be searched or filtered to identify a log file search result,
using the log file search result to searching the sorted help data, and
displaying the list of relevant search results related to the log file search result.

9. The system in accordance with claim 8, wherein the use of the log file search result to search the sorted help data and the display of the list of relevant search results related to the log file search result is automatic.

10. The system in accordance with claim 8, wherein the log file is from at least one of a computer operating system and an application log.

11. A method programmed for execution in a computing environment for accessing help content data from a plurality of help content data sources, wherein the plurality of help content data sources includes a first group of help content data sources accessible over a network and a second group of help content data sources stored in a memory of a server, wherein the second group of help content data sources includes one or more decision trees and one or more knowledge-based articles, wherein each of the one or more decision trees include a root node, at least two leaf nodes, and a branch connecting the root node to the at least two leaf nodes, wherein the root node and the at least two leaf nodes provide for the display of the help content data, wherein using a processor the method comprises the steps of:
   allowing for an insertion of an attachment or a link into at least one of the at least two leaf nodes of the one or more decision trees,
   locating the help content data by searching the first group of help content data sources over the network, and searching the second group of help content data sources stored in the memory of the server;
   sorting the located help content data so that the located help content data is searchable; and
   allowing the sorted help content data to be searched so that a list of relevant search results is displayed on a computing device, wherein each search result within the list of relevant search results includes access to the help content data,
   wherein the attachment or the link inserted into the at least one of the at least two leaf nodes of the one or more decision trees is configured to provide access to the help content data contained in at least one of the first group of help content data sources over the network, another one of the decision trees or one of the knowledge-based articles stored in the memory of the server.

12. The method in accordance with claim 11, wherein the first group of help content data sources includes at least one of website pages, blogs, chat bots, chat data, knowledge-based applications, customer relationship management (CRM) applications, email data, discussion forums, self-help portals, data lakes, and enterprise data sources.

13. The method in accordance with claim 11, wherein the help content data can be at least one of website content, data files, videos, pictures, text, instructions, or other help related information.

14. The method in accordance with claim 11, wherein the access to the help content data includes providing at least one of a link to access the respective help content data source or displaying information from the respective help content data source.

15. The method in accordance with claim 11, and wherein the computer-executable instructions further include allowing for the creation of the one or more knowledge-based articles.

16. The method in accordance with claim 15, wherein the computer-executable instructions further include allowing for a document to be attached to the one or more knowledge-based articles.

17. The method in accordance with claim 11, wherein the computer-executable instructions further include allowing for the creation of the one or more decision trees.

18. The method in accordance with claim 11, further including the steps of:
   receiving at least one log file, wherein each log file includes a plurality of log entries including unstructured log data;
   parsing the at least one log file to change the unstructured log data into structured log data;
   allowing the structured log data to be indexed to allow for the structured data to be searched or filtered to identify a log file search result;
   using the log file search result to searching the sorted help data; and
   displaying the list of relevant search results related to the log file search result.

19. The method in accordance with claim 18, wherein the use of the log file search result to search the sorted help data and the display of the list of relevant search results related to the log file search result is automatic.

20. The method in accordance with claim 18, wherein the log file is from at least one of a computer operating system and an application log.

21. A system including a cognitive knowledge platform for accessing help content data from a plurality of help content data sources, wherein the plurality of help content data sources includes a first group of help content data sources and a second group of help content data sources, the system comprising:
   a server comprising a memory and a processor, wherein the server is in communication with the first group of help content data sources over a network, and wherein the second group of help content data sources is stored in the memory of the server,
   wherein the processor is configured for executing computer-executable instructions stored in the memory comprising:
   locating the help content data by searching the first group of help content data sources over the network and the second group of help content data sources stored in the memory of the server,
   sorting the located help content data so that the located help content data is searchable, and
   allowing the sorted help content data to be searched so that a list of relevant search results are displayed on a computing device, wherein each search result within the list of relevant search results includes access to the help content data,
   wherein the server is configured for receiving at least one log file, wherein each log file includes a plurality of log entries including unstructured log data, and
   wherein the computer-executable instructions are further configured for:
   parsing the at least one log file to change the unstructured log data into structured log data,
   allowing the structured log data to be indexed to allow for the structured data to be searched or filtered to identify a log file search result,
   using the log file search result to searching the sorted help data, and
   displaying the list of relevant search results related to the log file search result.

22. The system in accordance with claim 21, wherein the first group of help content data sources includes at least one of website pages, blogs, chat bots, chat data, knowledge-based applications, customer relationship management (CRM) applications, email data, discussion forums, self-help portals, data lakes, and enterprise data sources.

23. The system in accordance with claim 21, wherein the help content data can be at least one of website content, data files, videos, pictures, text, instructions, links, attachments, flow charts, or other help related information.

24. The system in accordance with claim 21, wherein the access to the help content data includes providing at least one of a link to access the respective help content data source or displaying information from the respective help content data source.

25. The system in accordance with claim 21, wherein the second group of help content data sources includes at least one of a decision tree and knowledge-based article.

26. The system in accordance with claim 25, wherein the second group of help content data sources includes the knowledge-based article, and wherein the computer-executable instructions further include allowing for the creation of the knowledge-based article.

27. The system in accordance with claim 26, wherein the computer-executable instructions further include allowing for a document to be attached to the knowledge-based article.

28. The system in accordance with claim 25, wherein the second group of help content data sources includes the decision tree, and wherein the computer-executable instructions further include allowing for the creation of the decision tree.

29. The system in accordance with claim 28, wherein the decision tree includes a root node, at least two leaf nodes, and a branch connecting the root node to the at least two leaf nodes, wherein the root node and the at least two leaf nodes provide for the display of help data.

30. The system in accordance with claim 29, wherein the computer-executable instructions further allows for an insertion of a link into at least one of the at least two leaf nodes, wherein the link is configured to provide access to help content data contained in the help content data source in the first or second group of help content data sources.

31. The system in accordance with claim 21, wherein the use of the log file search result to search the sorted help content data and the display of the list of relevant search results related to the log file search result is automatic.

32. The system in accordance with claim 21, wherein the log file is from at least one of a computer operating system and an application log.

33. A method programmed for execution in a computing environment for accessing help content data from a plurality of help content data sources, wherein the plurality of help content data sources includes a first group of help content data sources and a second group of help content data sources, wherein using a processor the method comprises the steps of:
  locating the help content data by searching the first group of help content data sources over a network, and searching the second group of help content data sources stored in a memory;
  sorting the located help content data so that the located help content data is searchable;
  allowing the sorted help content data to be searched so that a list of relevant search results is displayed on a computing device, wherein each search result within the list of relevant search results includes access to the help content data;
  receiving at least one log file, wherein each log file includes a plurality of log entries including unstructured log data;
  parsing the at least one log file to change the unstructured log data into structured log data;
  allowing the structured log data to be indexed to allow for the structured data to be searched or filtered to identify a log file search result;
  using the log file search result to searching the sorted help data; and
  displaying the list of relevant search results related to the log file search result.

34. The method in accordance with claim 33, wherein the first group of help content data sources includes at least one of website pages, blogs, chat bots, chat data, knowledge-based applications, customer relationship management (CRM) applications, email data, discussion forums, self-help portals, data lakes, and enterprise data sources.

35. The method in accordance with claim 33, wherein the help content data can be at least one of website content, data files, videos, pictures, text, instructions, or other help related information.

36. The method in accordance with claim 33, wherein the access to the help content data includes providing at least one of a link to access the respective help content data source or displaying information from the respective help content data source.

37. The method in accordance with claim 33, wherein the second group of help content data sources includes at least one of a decision tree and knowledge-based article.

38. The method in accordance with claim 33, wherein the second group of help content data sources includes the knowledge-based article, and wherein the computer-executable instructions further include allowing for the creation of the knowledge-based article.

39. The method in accordance with claim 38, wherein the computer-executable instructions further include allowing for a document to be attached to the knowledge-based article.

40. The method in accordance with claim 33, wherein the second group of help content data sources includes the decision tree, and wherein the computer-executable instructions further include allowing for the creation of the decision tree.

41. The method in accordance with claim 40, wherein the decision tree includes a root node, at least two leaf nodes, and a branch connecting the root node to the at least two leaf nodes, wherein the root node and the at least two leaf nodes provide for the display of help data.

42. The method in accordance with claim 41, wherein the computer-executable instructions further allows for an insertion of a link into at least one of the at least two leaf nodes, wherein the link is configured to provide access to help content data contained in the help content data source in the first or second group of help content data sources.

43. The method in accordance with claim 33, wherein the use of the log file search result to search the sorted help data and the display of the list of relevant search results related to the log file search result is automatic.

44. The method in accordance with claim 33, wherein the log file is from at least one of a computer operating system and an application log.

45. A non-transitory computer-readable medium storing instructions programmed for execution in a computing environment for accessing help content data from a plurality of help content data sources, wherein the plurality of help content data sources includes a first group of help content data sources and a second group of help content data sources, wherein the instructions when executed by a processor are configured to perform operations comprising:

locating the help content data by searching the first group of help content data sources over a network, and searching the second group of help content data sources stored in a memory;

sorting the located help content data so that the located help content data is searchable;

allowing the sorted help content data to be searched so that a list of relevant search results is displayed on a computing device, wherein each search result within the list of relevant search results includes access to the help content data;

receiving at least one log file, wherein each log file includes a plurality of log entries including unstructured log data;

parsing the at least one log file to change the unstructured log data into structured log data;

allowing the structured log data to be indexed to allow for the structured data to be searched or filtered to identify a log file search result;

using the log file search result to searching the sorted help data; and displaying the list of relevant search results related to the log file search result.

46. The method in accordance with claim 45, wherein the first group of help content data sources includes at least one of website pages, blogs, chat bots, chat data, knowledge-based applications, customer relationship management (CRM) applications, email data, discussion forums, self-help portals, data lakes, and enterprise data sources.

47. The method in accordance with claim 45, wherein the help content data can be at least one of website content, data files, videos, pictures, text, instructions, or other help related information.

48. The method in accordance with claim 45, wherein the access to the help content data includes providing at least one of a link to access the respective help content data source or displaying information from the respective help content data source.

49. The method in accordance with claim 45, wherein the second group of help content data sources includes at least one of a decision tree and knowledge-based article.

50. The method in accordance with claim 45, wherein the second group of help content data sources includes the knowledge-based article, and wherein the computer-executable instructions further include allowing for the creation of the knowledge-based article.

51. The method in accordance with claim 50, wherein the computer-executable instructions further include allowing for a document to be attached to the knowledge-based article.

52. The method in accordance with claim 45, wherein the second group of help content data sources includes the decision tree, and wherein the computer-executable instructions further include allowing for the creation of the decision tree.

53. The method in accordance with claim 52, wherein the decision tree includes a root node, at least two leaf nodes, and a branch connecting the root node to the at least two leaf nodes, wherein the root node and the at least two leaf nodes provide for the display of help data.

54. The method in accordance with claim 53, wherein the computer-executable instructions further allows for an insertion of a link into at least one of the at least two leaf nodes, wherein the link is configured to provide access to help content data contained in the help content data source in the first or second group of help content data sources.

55. The computer-readable medium in accordance with claim 45, wherein the use of the log file search result to search the sorted help data and the display of the list of relevant search results related to the log file search result is automatic.

56. The computer-readable medium in accordance with claim 45, wherein the log file is from at least one of a computer operating system and an application log.

57. The system in accordance with claim 1, wherein a function is used to locate and provide access to the help content data in the first and second groups of help content data sources, wherein the function is at least one of a contextual search, document features, a scoring criteria, machine learning, a relevancy ranking, and caching.

58. The system in accordance with claim 57, wherein the function is a document feature, wherein the document feature includes at least one of a date of document creation, a publication date, a modification date, a last view date, a last liked date, a number of likes, a number of boosts, and a last boosting date.

59. The system in accordance with claim 1, wherein each search result within the list of relevant search results includes at least one of a relevancy rating, a counter to identify how many times the respective search result has been selected, and an indicator to signify that the respective search result was liked by a user.

60. The system in accordance with claim 59, wherein each search result within the list of relevant search results includes the relevancy rating, and wherein relevancy rating is based on at least one of a number of clicks on the respective search result, a title weight, an attachment title weight, a boost factor, help content weight, and an attachment content weight.

61. The system in accordance with claim 60, wherein the boost factor is selected weight provided to a respective search result based on a number of times the respective search result has been clicked when displayed in the list of relevant search results.

62. The system in accordance with claim 1, wherein the processor is further configured for allowing access to the respective help content data, and timing how long the respective help content data is accessed.

* * * * *